US010189411B2

(12) United States Patent
De Wind et al.

(10) Patent No.: US 10,189,411 B2
(45) Date of Patent: Jan. 29, 2019

(54) INTERIOR REARVIEW MIRROR WITH GDO MODULE

(71) Applicant: MAGNA MIRRORS OF AMERICA, INC., Holland, MI (US)

(72) Inventors: Darryl P. De Wind, West Olive, MI (US); Craig Kendall, Grand Haven, MI (US); Christopher R. Koetje, Zeeland, MI (US); Niall R. Lynam, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 40 days.

(21) Appl. No.: 15/511,842

(22) PCT Filed: Sep. 18, 2015

(86) PCT No.: PCT/US2015/050904
§ 371 (c)(1),
(2) Date: Mar. 16, 2017

(87) PCT Pub. No.: WO2016/044706
PCT Pub. Date: Mar. 24, 2016

(65) Prior Publication Data
US 2017/0297497 A1  Oct. 19, 2017

Related U.S. Application Data

(60) Provisional application No. 62/198,887, filed on Jul. 30, 2015, provisional application No. 62/158,839, (Continued)

(51) Int. Cl.
*B60Q 3/258* (2017.01)
*B60R 1/12* (2006.01)
(Continued)

(52) U.S. Cl.
CPC .................. *B60R 1/12* (2013.01); *B60Q 3/258* (2017.02); *B60R 1/04* (2013.01); *F21S 9/02* (2013.01);
(Continued)

(58) Field of Classification Search
CPC .......... B60Q 3/258; B60R 1/12; B60R 1/1207
See application file for complete search history.

(56) References Cited

U.S. PATENT DOCUMENTS 4,862,594 A    9/1989  Schierbeek et al.
4,937,945 A    7/1990  Schofield et al.
(Continued)

FOREIGN PATENT DOCUMENTS

EP        0689963        1/1996
WO     WO2016/044706    3/2016

OTHER PUBLICATIONS

International Search Report and Written Opinion dated Dec. 15, 2015 for corresponding PCT Application No. PCT/US2015/050904.
(Continued)

*Primary Examiner* — Anh Mai
*Assistant Examiner* — Steven Horikoshi
(74) *Attorney, Agent, or Firm* — Honigman Miller Schwartz and Cohn, LLP

(57) ABSTRACT

An interior rearview mirror assembly for a vehicle includes a mirror head having a mirror casing and a mirror reflective element, and a mirror mounting structure configured to adjustably mount the mirror head at an interior portion of a vehicle. A receiving portion is configured for receiving a portable self-contained garage door opening module at least partially thereat. The module includes a user input and a housing that houses (i) circuitry, (ii) a transmitter and (iii) a battery. The module is operable to wirelessly transmit responsive to actuation of the user input. With the module at
(Continued)

the receiving portion of the mirror assembly, the user input is accessible by the vehicle driver. The module is configured to cooperate with the receiving portion to releasably secure the module at the interior rearview mirror assembly, with the module being releasable from the interior rearview mirror assembly.

20 Claims, 39 Drawing Sheets

Related U.S. Application Data filed on May 8, 2015, provisional application No. 62/156,635, filed on May 4, 2015, provisional application No. 62/065,232, filed on Oct. 17, 2014, provisional application No. 62/062,478, filed on Oct. 10, 2014, provisional application No. 62/052,523, filed on Sep. 19, 2014.

(51) Int. Cl.
*B60R 1/04* (2006.01)
*F21S 9/02* (2006.01)
*F21V 23/04* (2006.01)
*F21Y 115/10* (2016.01)
*G02F 1/157* (2006.01)
*G02F 1/161* (2006.01)

(52) U.S. Cl.
CPC .. *F21V 23/0464* (2013.01); *B60R 2001/1253* (2013.01); *B60R 2001/1284* (2013.01); *B60R 2001/1292* (2013.01); *F21Y 2115/10* (2016.08); *G02F 1/157* (2013.01); *G02F 1/161* (2013.01); *G02F 2203/02* (2013.01)

(56) References Cited

U.S. PATENT DOCUMENTS

| | | | |
|---|---|---|---|
| 5,131,154 A | 7/1992 | Schierbeek et al. |
| 5,255,442 A | 10/1993 | Schierbeek et al. |
| 5,455,716 A | 10/1995 | Suman et al. |
| 5,632,092 A | 5/1997 | Blank et al. |
| 5,667,176 A | 9/1997 | Zamarripa et al. |
| 5,680,263 A | 10/1997 | Zimmerman et al. |
| 5,708,415 A | 1/1998 | Van Lente et al. |
| 5,798,688 A | 8/1998 | Schofield |
| 5,854,593 A | 12/1998 | Dykema et al. |
| 5,924,212 A | 7/1999 | Domanski |
| 5,971,552 A | 10/1999 | O'Farrell et al. |
| 6,091,343 A | 7/2000 | Dykema et al. |
| 6,172,613 B1 | 1/2001 | DeLine et al. |
| 6,243,003 B1 | 6/2001 | DeLine et al. |
| 6,278,377 B1 | 8/2001 | DeLine et al. |
| 6,347,872 B1 | 2/2002 | Brechbill et al. |
| 6,362,771 B1 | 3/2002 | Schofield et al. |
| 6,396,408 B2 | 5/2002 | Drummond et al. |
| 6,420,975 B1 | 7/2002 | DeLine et al. |
| 6,428,172 B1 | 8/2002 | Hutzel et al. |
| 6,477,464 B2 | 11/2002 | McCarthy et al. |
| 6,485,081 B1 | 11/2002 | Bingle et al. |
| 6,678,614 B2 | 1/2004 | McCarthy et al. |
| 6,728,375 B1 | 4/2004 | Palett et al. |
| 6,902,284 B2 | 6/2005 | Hutzel et al. |
| 6,946,978 B2 | 9/2005 | Schofield |
| 6,998,977 B2 | 2/2006 | Gregori et al. |
| 7,004,593 B2 | 2/2006 | Weller et al. |
| 7,012,727 B2 | 3/2006 | Hutzel et al. |
| 7,023,322 B2 | 4/2006 | Baumgardner et al. |
| 7,167,796 B2 | 1/2007 | Taylor et al. |
| 7,293,888 B2 | 11/2007 | Hutzel et al. |
| 7,308,341 B2 | 12/2007 | Schofield et al. |
| 7,324,261 B2 | 1/2008 | Tonar |
| 7,657,052 B2 | 2/2010 | Larson et al. |
| 7,734,392 B2 | 6/2010 | Schofield |
| 8,421,591 B2 | 4/2013 | Karasek |
| 8,508,831 B2 | 8/2013 | De Wind et al. |
| 8,547,055 B2 | 10/2013 | Mack |
| 8,577,549 B2 | 11/2013 | Schofield et al. |
| 8,779,910 B2 | 7/2014 | DeLine et al. |
| 8,922,356 B2 | 12/2014 | Lambert et al. |
| 2002/0140289 A1 | 10/2002 | McConnell et al. |
| 2004/0057131 A1 | 3/2004 | Hutzel et al. |
| 2004/0239482 A1 | 12/2004 | Fitzgibbon |
| 2005/0134983 A1 | 6/2005 | Lynam |
| 2006/0050018 A1 | 3/2006 | Hutzel |
| 2011/0121148 A1 | 5/2011 | Pernia |
| 2014/0015976 A1 | 1/2014 | DeLine et al. |
| 2014/0111320 A1 | 4/2014 | Holt et al. |
| 2014/0117757 A1 | 5/2014 | Tsui et al. |
| 2014/0366105 A1 | 12/2014 | Bradley et al. |
| 2015/0002262 A1 | 1/2015 | Geerlings et al. |
| 2016/0037664 A1 | 2/2016 | Hendricks |
| 2016/0288647 A1 | 10/2016 | Baur |

OTHER PUBLICATIONS

European Search Report and Written Opinion dated Feb. 9, 2018 from correspondence European Patent Application No. 15841787.3.

PRESS BUTTON TO RELEASE

INDENT PREVENTS UNIT FROM FALLING

18

PULL TO REMOVE

18

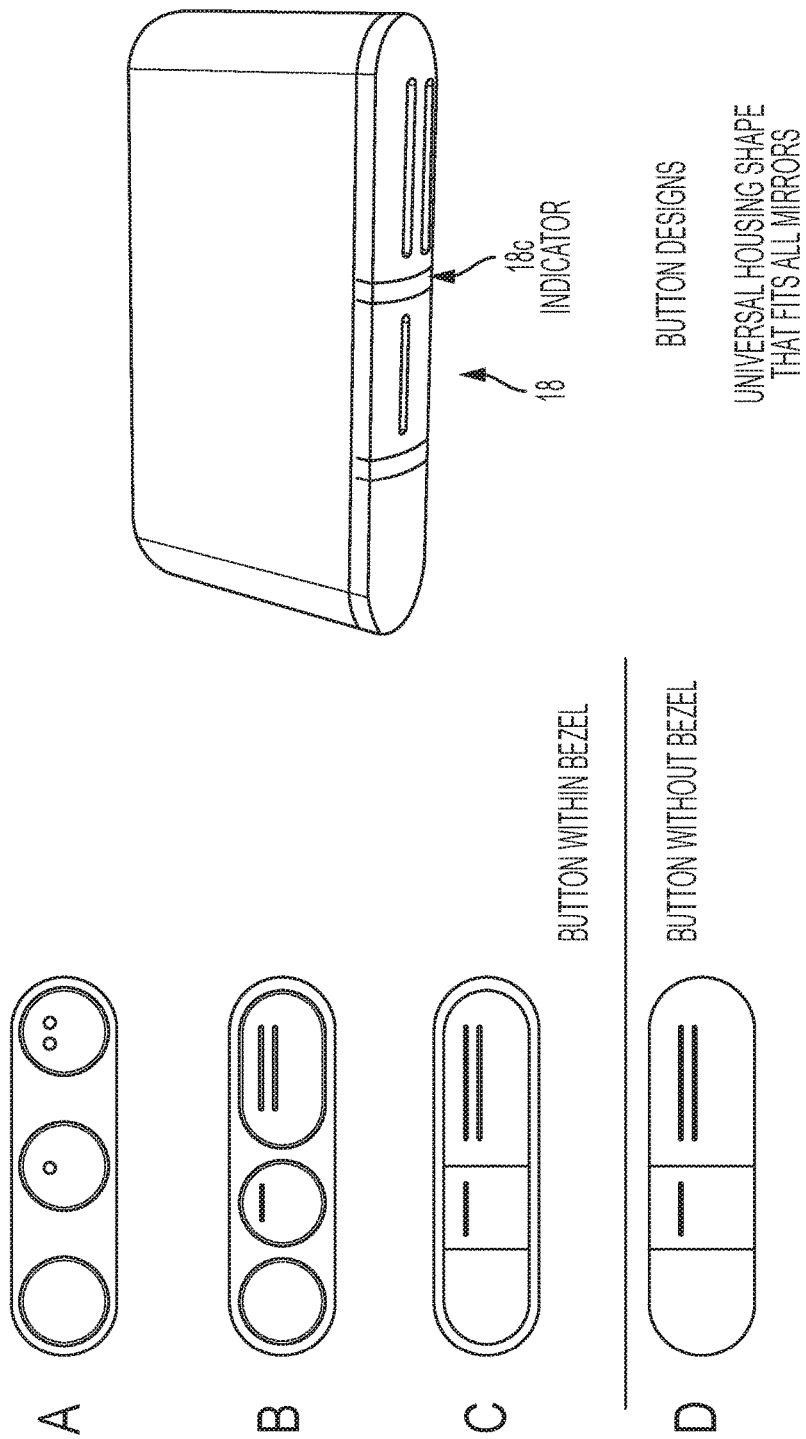

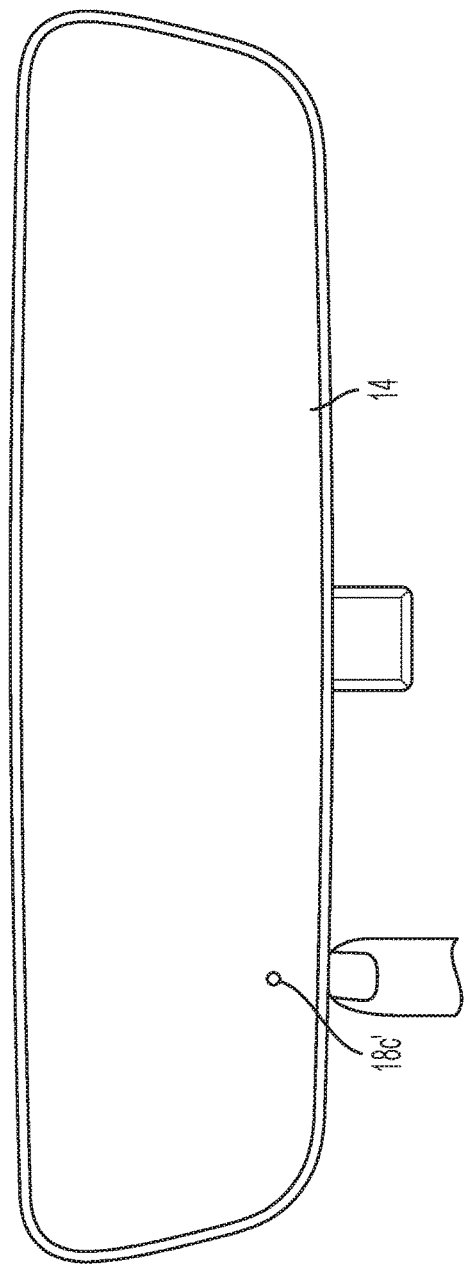

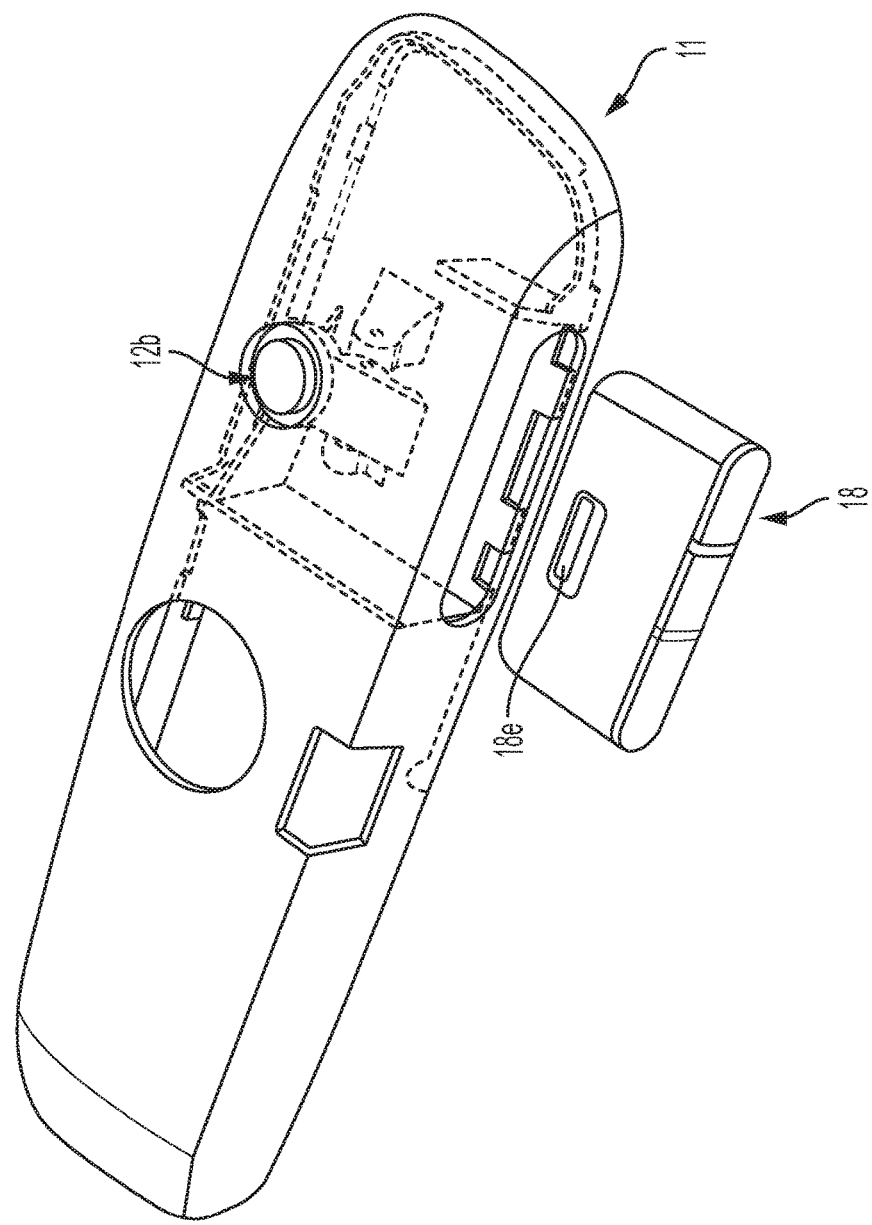

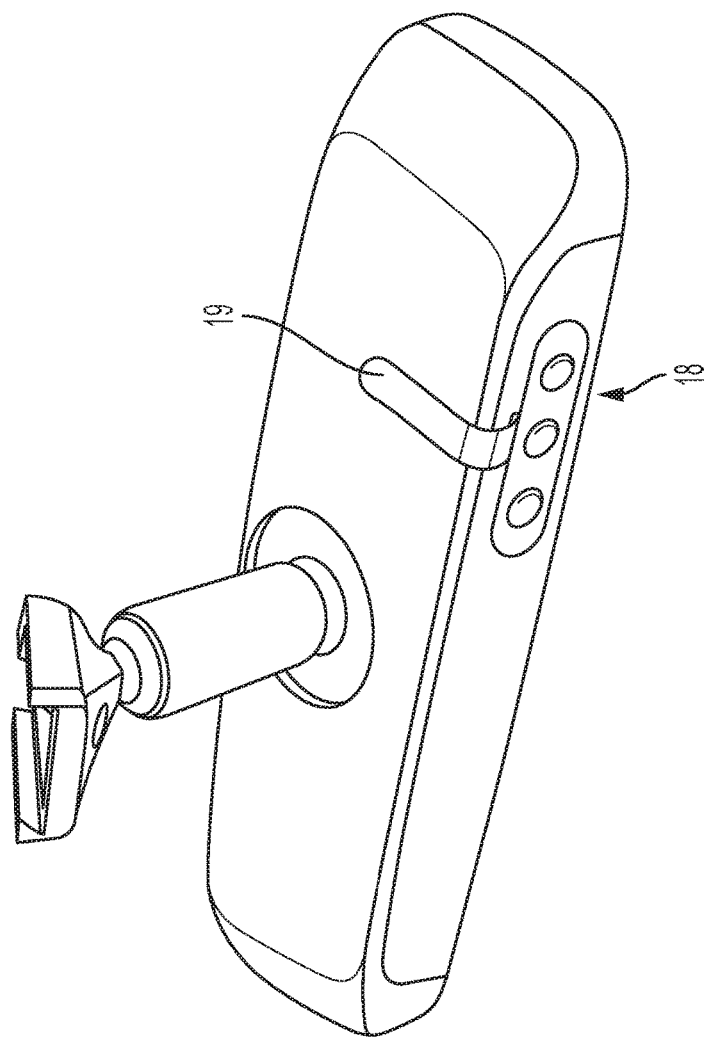

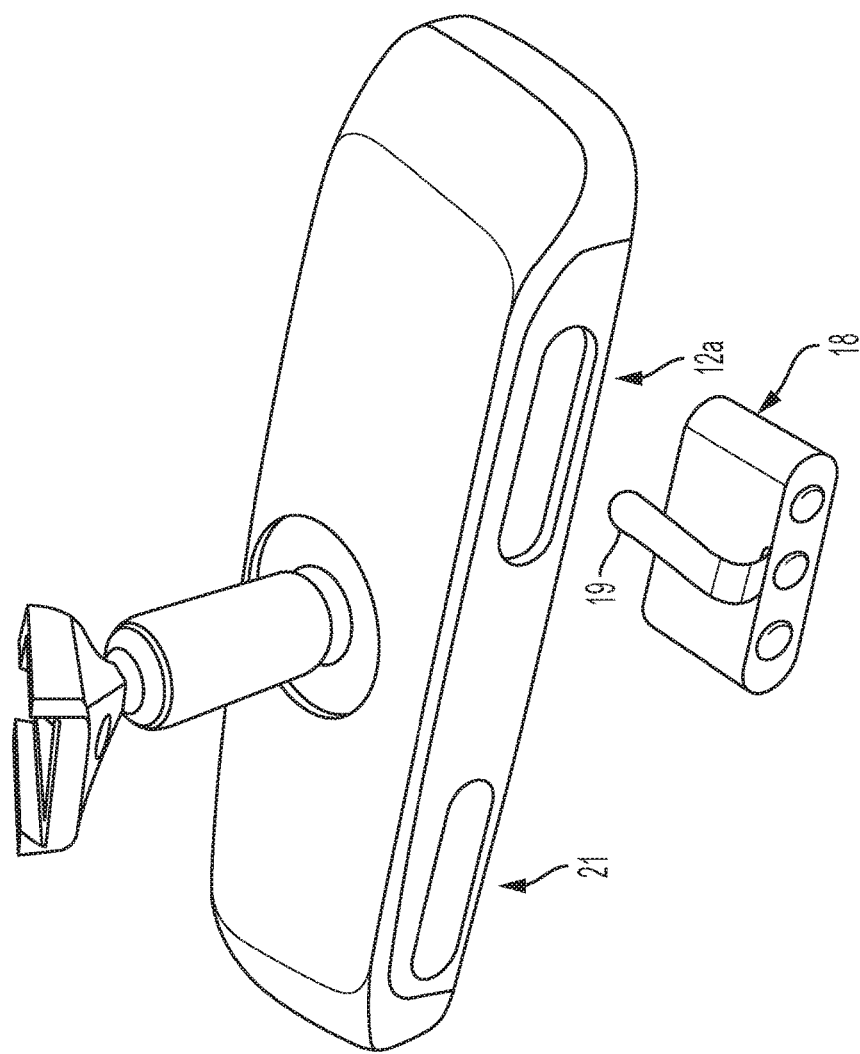

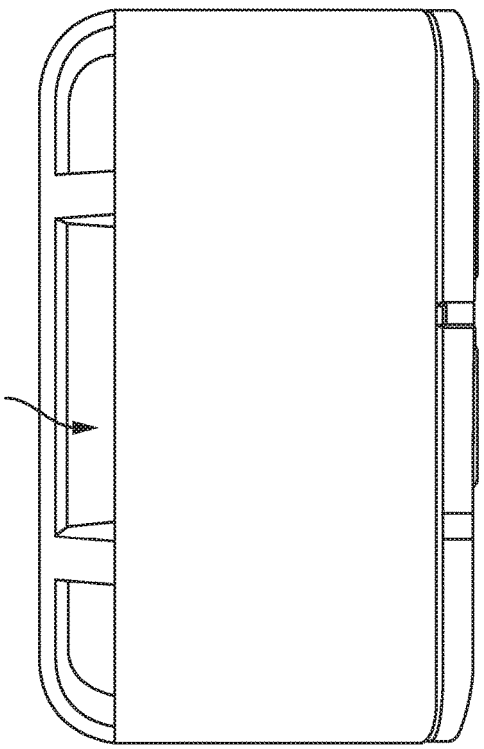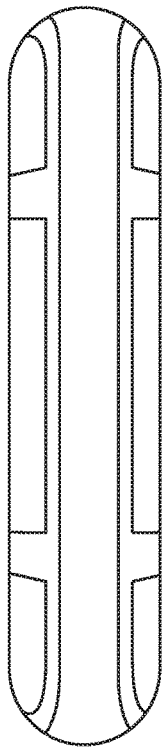
FIG. 21
FIG. 22

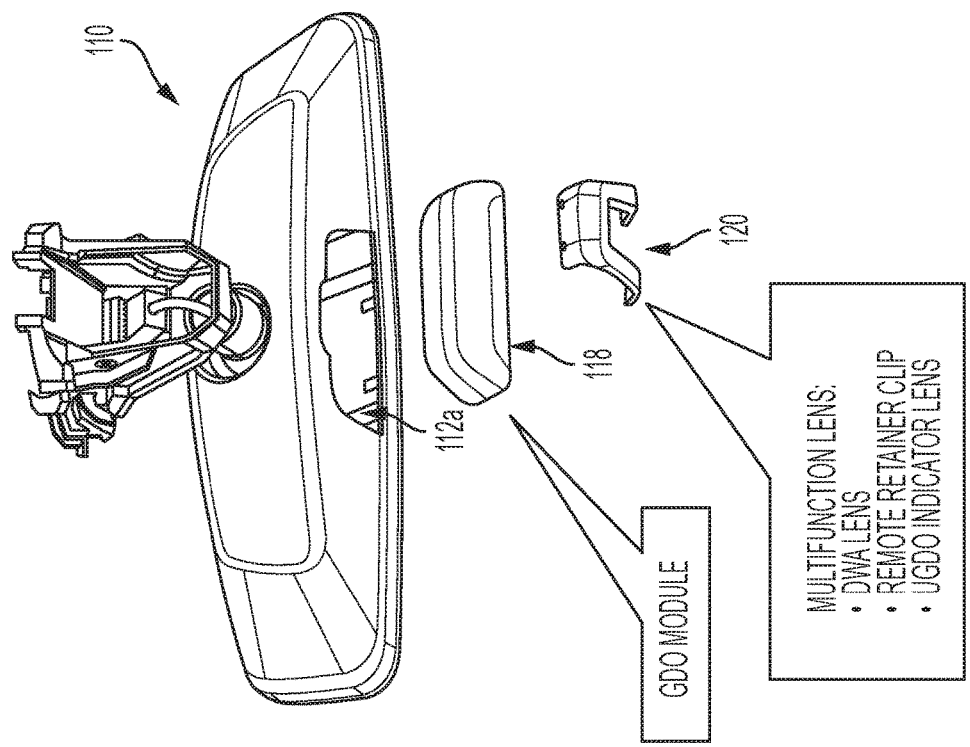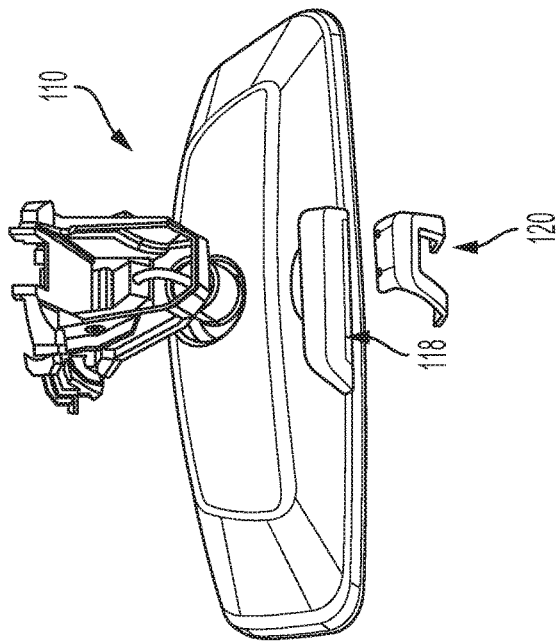
FIG. 33
FIG. 34

INTERIOR REARVIEW MIRROR WITH GDO MODULE

CROSS REFERENCE TO RELATED APPLICATIONS

The present application a 371 national phase filing of PCT Application No. PCT/US2015/050904, filed Sep. 18, 2015, which claims the filing benefits of U.S. provisional applications, Ser. No. 62/198,887, filed Jul. 30, 2015, Ser. No. 62/158,839, filed May 8, 2015, Ser. No. 62/156,635, filed May 4, 2015, Ser. No. 62/065,232, filed Oct. 17, 2014, Ser. No. 62/062,478, filed Oct. 10, 2014, and Ser. No. 62/052,523, filed Sep. 19, 2014, which are hereby incorporated herein by reference in their entireties.

FIELD OF THE INVENTION

The present invention relates generally to the field of interior rearview mirror assemblies for vehicles and, more particularly, with an interior rearview mirror assembly that includes a garage door opening function or feature.

BACKGROUND OF THE INVENTION

It is known to provide a mirror assembly that includes a garage door opener incorporated therein. For example, the HOMELINK® system may be incorporated into the rearview mirror. Examples of such systems are described in U.S. Pat. Nos. 6,396,408; 6,172,613; 6,091,343; 5,854,593 and 5,708,415, which are hereby incorporated herein by reference in their entireties.

SUMMARY OF THE INVENTION

The present invention provides an interior rearview mirror assembly that has a detachable self-contained, battery-powered garage door opening module or unit that is disposed at or in or at least partially in an interior rearview mirror assembly of a vehicle. The self-contained garage door opening module includes a battery or integrated power source, a transmitter (for transmitting a signal to actuate a garage door opener at a garage), circuitry and one or more user inputs or buttons. The garage door opening module is configured to be inserted at least partially into a receiving portion of the mirror casing of the mirror assembly, such that the user inputs or buttons are viewable and accessible and actuatable at an exterior portion of the mirror casing. The detachable self-contained battery operated garage door opening module, when detached from the interior rearview mirror assembly, is portable by the owner of the vehicle or another user of the vehicle. For example, the detachable self-contained battery operated garage door opening module can be detached from the interior rearview mirror assembly and can be carried by a user for use external and distant from the vehicle or can be inserted into another interior rearview mirror assembly in another vehicle. Thus, when, for example, the vehicle owner sells his or her vehicle, the owner may detach the subject garage door opening module for use in another vehicle, thereby enhancing utility of the detachable self-contained battery operated garage door opening module and also enhancing security, given that the original vehicle can now be sold or otherwise disposed of without integrated inclusion therein of the subject garage door opening module. The detachable self-contained battery operated garage door opening module may also include an indicator (such as a light emitting diode or the like) that is illuminated or activated when one or more of the buttons is pressed to indicate to the user that the garage door opening module is activated (and optionally to indicate to the user that the garage door opening module is learning or is ready to learn the appropriate code for controlling the selected garage door opener at the user's garage).

These and other objects, advantages, purposes and features of the present invention will become apparent upon review of the following specification in conjunction with the drawings.

BRIEF DESCRIPTION OF THE DRAWINGS

FIG. 5 shows plan views A-E of garage door opening modules of the present invention, showing various button options for the modules;

FIG. 6 is a perspective view of a garage door opening module of the present invention, showing an indicator at the user inputs or buttons of the module;

FIG. 7 is a plan view of another interior rearview mirror assembly and garage door opening module of the present invention, showing an indicator of the module that is viewable (when activated) through the reflective element of the interior rearview mirror assembly;

FIG. 8 is a perspective view of an interior rearview mirror assembly with a garage door opening module that is removably retained or secured thereat via a latching mechanism in accordance with the present invention;

FIG. 9 is a perspective view of another interior rearview mirror assembly, with another portable garage door opening module of the present invention;

FIG. 10 is another perspective view of the interior rearview mirror assembly of FIG. 9, with the portable garage door opening module removed, and shown with a portable light module received in another receiving portion of the mirror assembly;

FIG. 21 is a plan view of a portable garage door opening module of the present invention, with symmetrical latching configuration to allow for insertion of the module into the receiving portion of a mirror assembly in different orientations;

FIG. 22 is a top plan view of the portable garage door opening module of FIG. 21;

FIG. 33 is an exploded perspective view of the mirror assembly and garage door opening module and lens or cover in accordance with the present invention;

FIG. 34 is another exploded perspective view of the mirror assembly and garage door opening module and lens or cover of FIG. 33, showing the module received at the mirror casing;

DESCRIPTION OF THE PREFERRED EMBODIMENTS

Figure 1:
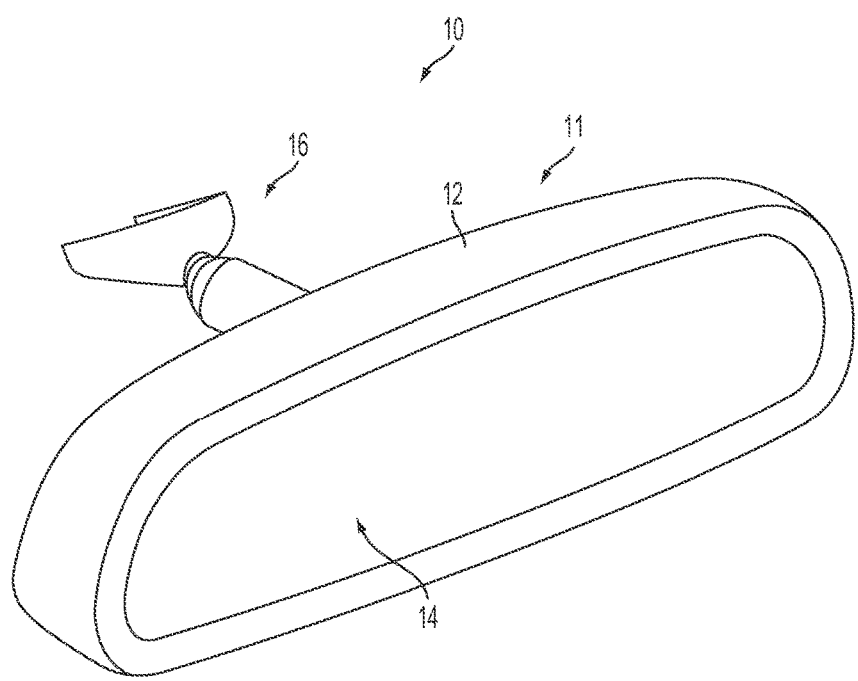
FIG. 1 is a perspective view of an interior rearview mirror assembly in accordance with the present invention.
Figure 2:
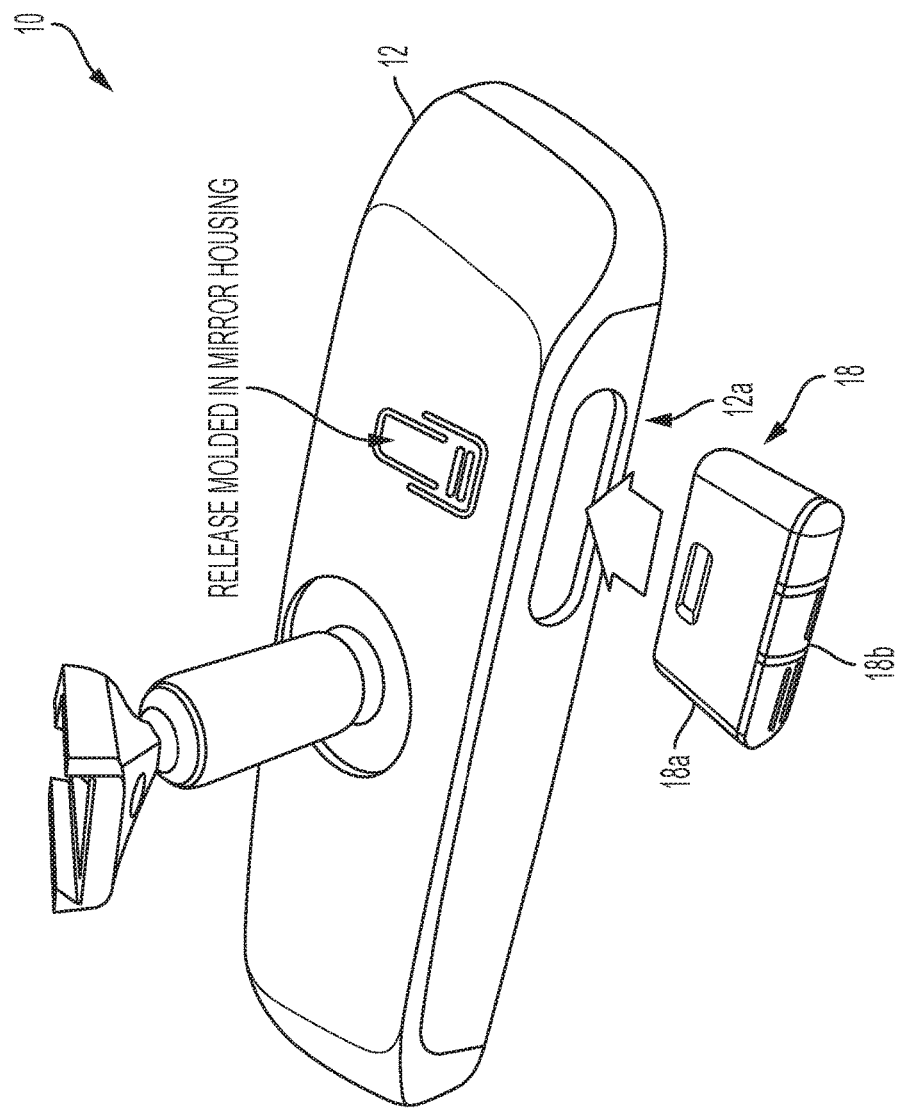
FIG. 2 is a rear perspective view of the interior rearview mirror assembly of FIG. 1, showing the garage door opening module detached from the mirror assembly, with the garage door opening module being attachable and retainable via a molded tab of the mirror casing.

Referring now to the drawings and the illustrative embodiments depicted therein, an interior rearview mirror assembly 10 for a vehicle includes a mirror head 11 comprising a mirror casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. A garage door opening module 18 is configured to be received in a receiving portion 12a (such as an aperture or recess or the like and structure established thereat) of the mirror casing 12, such as shown in FIG. 2. The garage door opening module 18 comprises a self-contained module or unit that includes an integrated power source or battery and circuitry, such as control or garage door opener circuitry (operating under rolling code) and a transmitter (such as a radio frequency or RF transmitter) for transmitting a signal (such as a RF signal) to a garage door opener at a garage, as discussed below.

As shown in FIG. 2, the self-contained garage door opening module 18 comprises a casing or housing 18a and one or more user inputs or buttons 18b. The housing is configured to insert into or be at least partially received at the opening or aperture 12a of the mirror casing 12 to attach the garage door opening module 18 at the mirror assembly 10. Thus, the module is configured to cooperate with the receiving portion (such as structure of the module cooperating with structure of the receiving portion) to releasably secure the portable self-contained garage door opening module at least partially at the receiving portion, and the module is configured to cooperate with the receiving portion to release the module from the receiving portion, as discussed below. The portable self-contained garage door opening module comprises at least one user input and a housing that houses (i) garage door opener circuitry operable under rolling code, (ii) a radio frequency transmitter and (iii) a battery for electrically powering the circuitry. The portable self-contained garage door opening module is operable to wirelessly transmit (via the circuitry) a radio frequency signal responsive to actuation of the user input or inputs or buttons of the portable self-contained garage door opening module. Optionally, and desirably, the garage door opening module or modules may be formed or manufactured with a universal housing shape that is configured to fit in recesses or apertures of various mirror casings so as to provide a universal garage door opening module for a variety of mirror applications.

The housing of the portable self-contained garage door opening module is preferably sealed so as to be substantially water impervious to limit or substantially preclude water intrusion into the housing and circuitry of the sealed module or unit. Thus, the sealed self-contained garage door opening module or unit is suitable to be used as a portable unit and carried by a user in adverse weather conditions, such as rain or snow, high humidity conditions and/or the like. The sealed self-contained garage door opening module or unit thus can be removed from the mirror assembly and carried by the driver or user in adverse weather conditions.

In the illustrated embodiment of FIG. 2, the garage door opening module housing includes a notch and the mirror casing includes a flexible tab that flexes to engage the notch when the module is received in the casing to releasably secure or retain the module at the mirror casing, with the user inputs or buttons disposed at a lower portion of the mirror casing, where they are readily accessible by a user of the mirror assembly and garage door opening module. Thus, the garage door opening module may be readily inserted into the receiving portion of the mirror casing (such as through an opening or slot established through a wall of the mirror casing) and may be readily detached from the mirror casing (such as for replacement of the battery of the module or the like).

Figure 3:
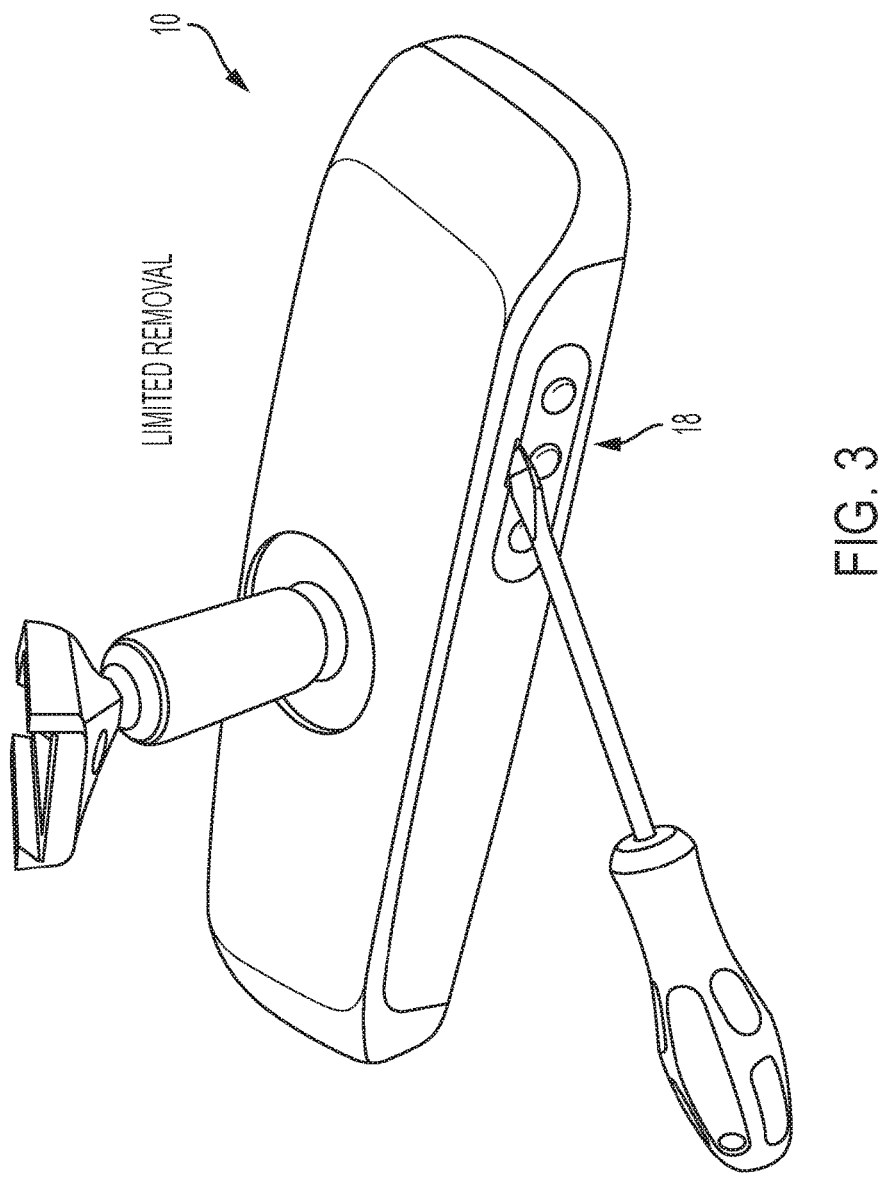
FIG. 3 is a rear perspective view of another interior rearview mirror assembly and garage door opening module of the present invention.
Figure 4A:
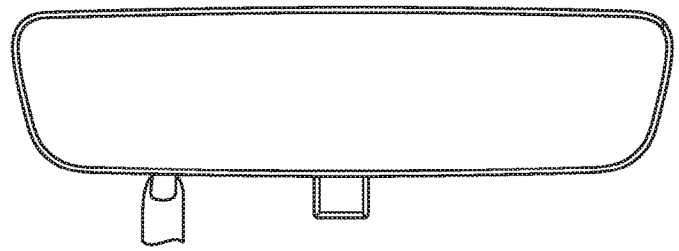
FIGS. 4A-C are plan views of an interior rearview mirror assembly of the present invention, showing optional steps to release and remove the garage door opening module from the mirror assembly.
Figure 4B:
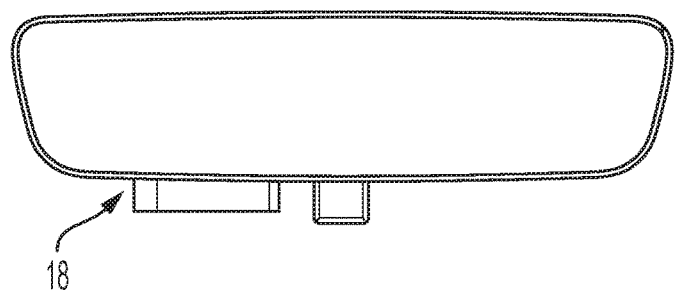
Figure 4C:
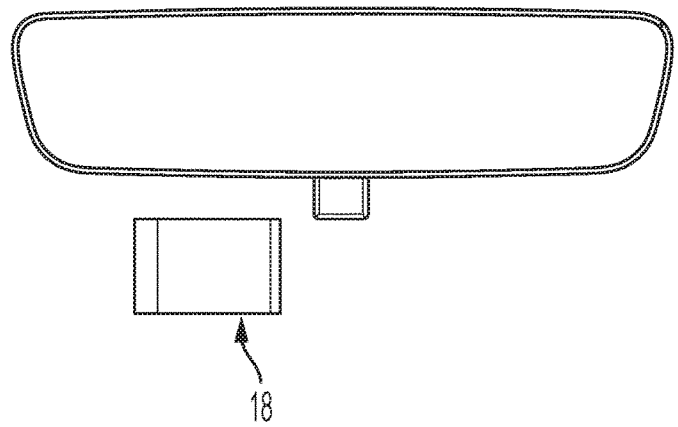

Optionally, the garage door opening module may be more securely attached at the mirror casing (such that the module is not readily detached from the mirror casing), where a tool may be used to remove the module from the mirror casing (such as shown in FIG. 3). Optionally, and as shown in FIG. 4, the garage door opening module may be inserted into the mirror casing and retained or secured thereat, with the retention or securement means or construction comprises a push-to-release mechanism. For example, the retention means or mechanism may comprise a spring-loaded mechanism that, when the module is pushed in a first time, retains or secures the module in the mirror casing and, when the retained or secured module is pushed a second time, releases the module from the mirror casing and urges the module at least partially outwards from the mirror casing so that the user can readily grasp the module and remove the module from the mirror casing. As shown in FIG. 4, the garage door opening module may include an indent or catch that, when the module is initially released from the casing, engages the mirror casing to keep the module from falling out of the casing, whereby the module may then be pulled (or pushed to release the latch mechanism) to remove it completely from the mirror casing (and optionally upon release of the latch mechanism, the module may drop at least partially out of the mirror casing whereby the user may readily grasp the module to remove it from the mirror casing). Optionally, and such as shown in FIG. 8, the mirror assembly may have a button or protrusion 12b that can be pushed to move a latching element or structure to release the module from the mirror assembly. The module may be inserted into the receiving portion until the latching element flexes and engages a latching element or structure 18e of the module to releasably secure or retain the module at least partially within the mirror casing of the mirror assembly. Optionally, the structure or receiving portion may comprise or include a fastener, such as a snap or push fastener or a threaded fastener such as a screw or the like, that, when inserted/tightened at a passageway (such as a threaded passageway) of the mirror casing and/or module, secures the module at the receiving portion (and the fastener may be readily removed to allow for removal of the module from the receiving portion). Thus, the garage door opening module may be readily secured or retained at and released from the mirror casing such that the module is readily portable so the user can take the module out of the mirror casing and out of the vehicle as desired.

Optionally, the garage door opening module may comprise the garage door opening function and may have an attachment or mounting portion or mechanism, such as at an end of the module opposite the garage door opening buttons or inputs. The user may select a desired optional feature or device or structure or attachment to attach at the end of the module to customize the module for his or her personal preferences. For example, the user may attach an LED device at the end of the module or may attach a toothpick or pocket knife or other attachment (such as other functions or features or structures of the types discussed below). The garage door opening module thus is customizable for the particular user, whereby the user may purchase the base garage door opening module and one or more different attachments that may be selectively attached at the base module by the user. The attachment may snap or click onto the base module and may be readily detached to change to a different attachment as desired. For attachments that require power (such as an LED light or the like), electrical connection to a battery of the base garage door opening module may be made when the attachment is attached at the base module or optionally the attachment (such as an LED light or the like) may include its own power source (such as a lithium battery or the like).

Figure 11:
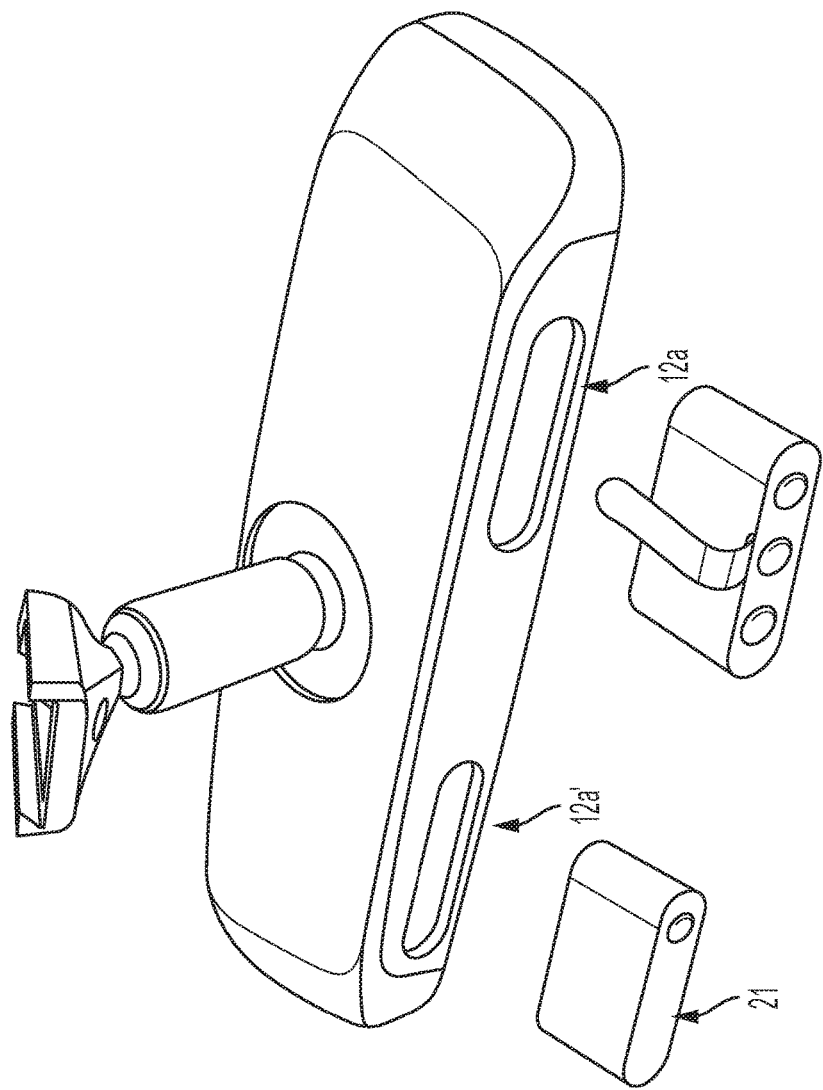
FIG. 11 is another perspective view of the interior rearview mirror assembly of FIG. 10, shown with the portable light module removed from the mirror assembly.

Optionally, and as shown in FIGS. 9-11, the portable garage door opening module may include a spring or clip 19 that retains or secures the module 18 in the mirror assembly. Such a clip may be similar to a clip on a conventional garage door opener that clips to a sun visor of a vehicle or the like. With such a configuration, the garage door opening module may be clipped at the mirror assembly of an equipped vehicle or may be clipped at a sun visor or the like of that vehicle or another vehicle (and if the clip-equipped portable garage door opening module should be removed from an interior rearview mirror assembly into which it had been inserted, then another portable module, such as the types described below, can be disposed at the receiving portion of the mirror assembly).

When received in the receiving portion of the mirror assembly, the garage door opening module may be generally flush with the outer or lower surface of the mirror casing at the slot or recess of the receiving portion, or the module may be nested in the mirror casing or may be proud of or may protrude from the mirror casing. Any LED indicators or user-actuated buttons and/or switches or the like preferably protrude down a little from the lower wall of the mirror casing so as to be more readily viewable by the driver and/or to be more readily accessible to/activated by/operable by the driver who is operating the equipped vehicle.

Optionally, although shown and described as being received substantially into an aperture or recess at the lower part of the mirror casing, the garage door opening module may be received into a receiving portion of the mirror assembly that is established at a side or upper region of the mirror casing. Optionally, although shown and described as being at the lower part of the mirror casing, the receiving portion of the mirror assembly may comprise a pocket or recess established at a rear portion of the mirror casing (such as at a recess established at the rear of a mirror casing of the types described in U.S. Pat. No. 8,508,831, which is hereby incorporated herein by reference in its entirety), whereby the module may be substantially exposed at the pocket at the rear of the mirror casing. Optionally, the garage door opening module of the present invention may be configured to attach elsewhere, such as at the mounting portion or base of the mirror assembly, or at a windshield electronics module or accessory module at or near or remote from the interior rearview mirror assembly. Optionally, and less desirably, the garage door opening module may be configured to attach elsewhere remote from the interior rearview mirror assembly and windshield, such as at a sun visor or header or console of the vehicle or the like.

The garage door opening module may include one or more buttons or user inputs for actuating or controlling circuitry of the module. Optionally, and with reference to FIG. 5, the garage door opening module may include various shaped buttons, either with a bezel portion around the buttons (A-C in FIG. 5) or without a bezel portion (D and E in FIG. 5). Optionally, and with reference to FIG. 6, the garage door opening module may include an indicator 18c (such as a light emitting diode (LED) or the like) that is actuatable responsive to a user pressing one or more of the buttons of the module to indicate to the user that the module has been actuated (for example, to indicate that the module is transmitting its signal to a garage door opener at a garage or to indicate that the module is learning a signal code or has learned a signal code for an associated garage door opener, and optionally the module may include a plurality of indicators or LEDs that are individually and/or cooperatively actuatable to indicate respective functions). The LEDs, when activated to emit light, may be visible at the exposed portion of the module at the lower region of the mirror casing. Optionally, and with reference to FIG. 7, the indicator 18c' of the garage door opening module may be at a portion of the garage door opening module that is disposed in the mirror casing and behind the reflective element 14, whereby the indicator, when activated or energized, is viewable through the mirror reflective element (such as through a partially transmissive, partially reflective or transflective mirror reflector of the mirror reflective element).

Figure 12:
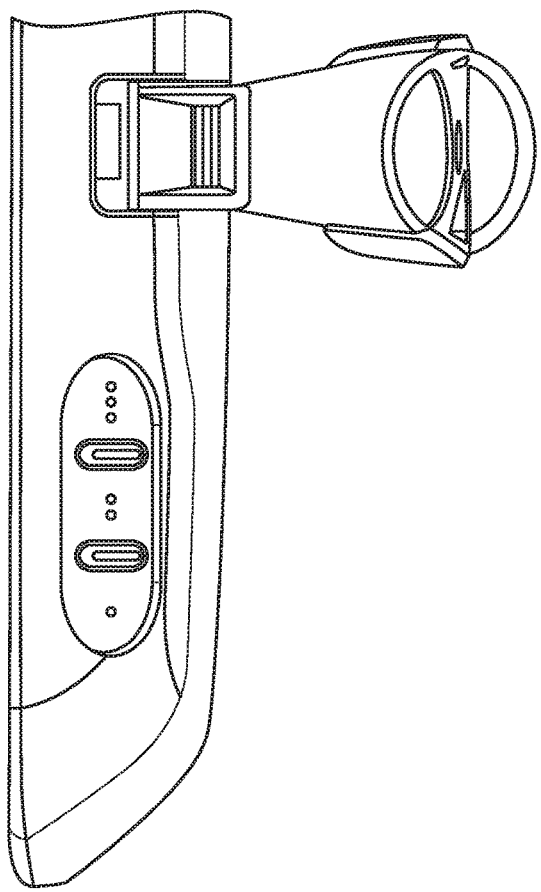
FIG. 12 is an underside view of a portion of the interior rearview mirror assembly of the present invention, showing the portable garage door opening module disposed thereat.
Figure 13:
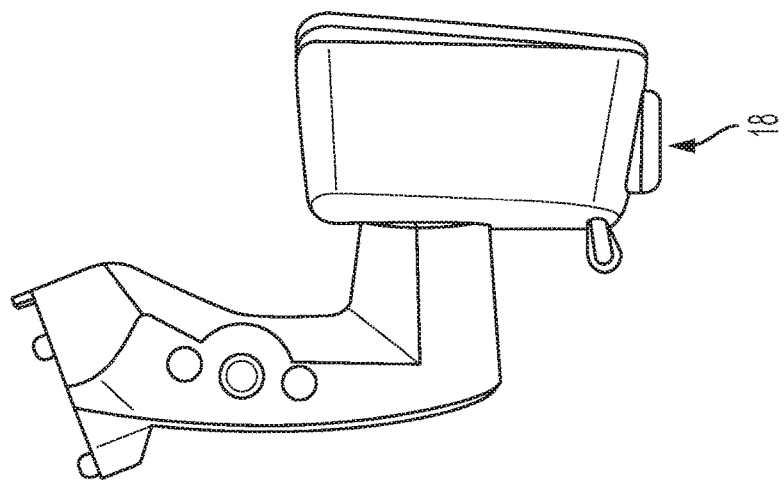
FIG. 13 is a side elevation of the interior rearview mirror assembly of FIG. 12.
Figure 14:
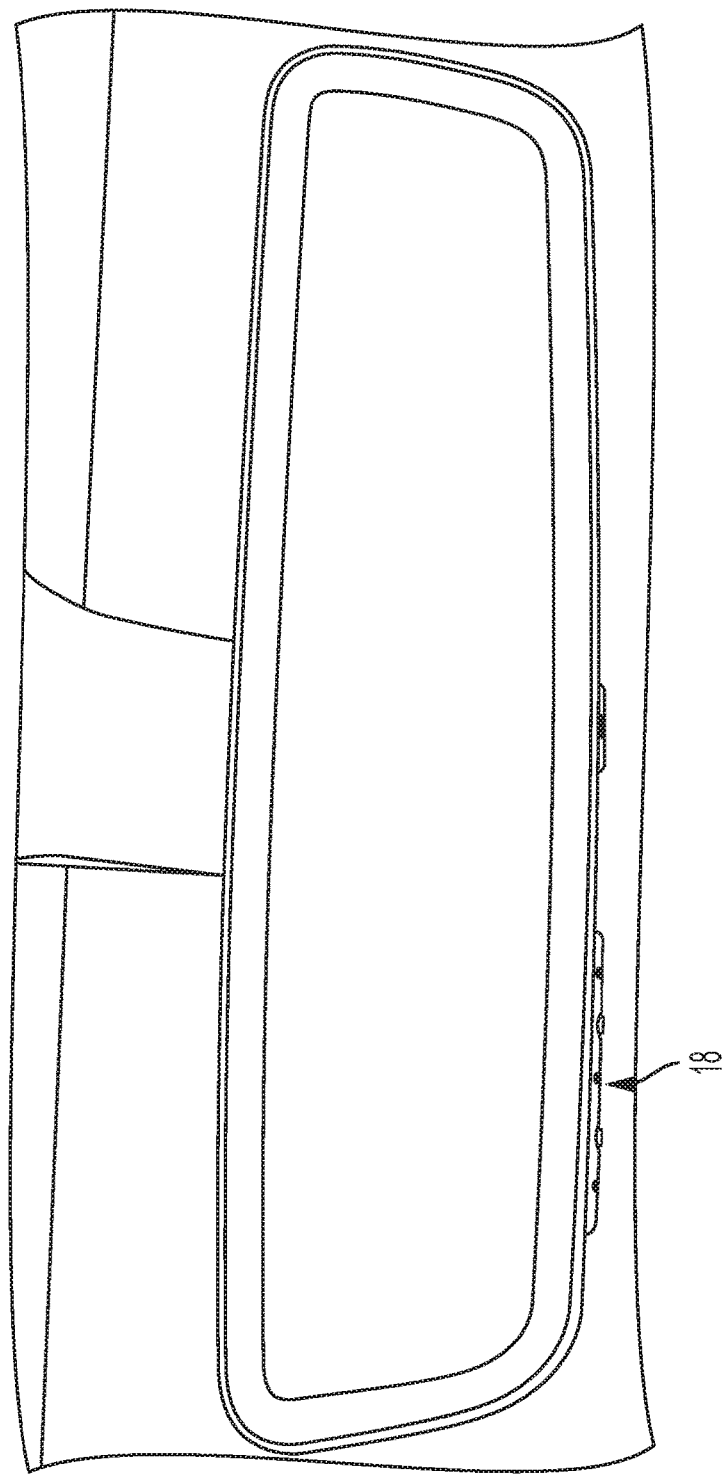
FIGS. 14-16 are plan views of interior rearview mirror assemblies having a portable garage door opening module disposed thereat.
Figure 15:
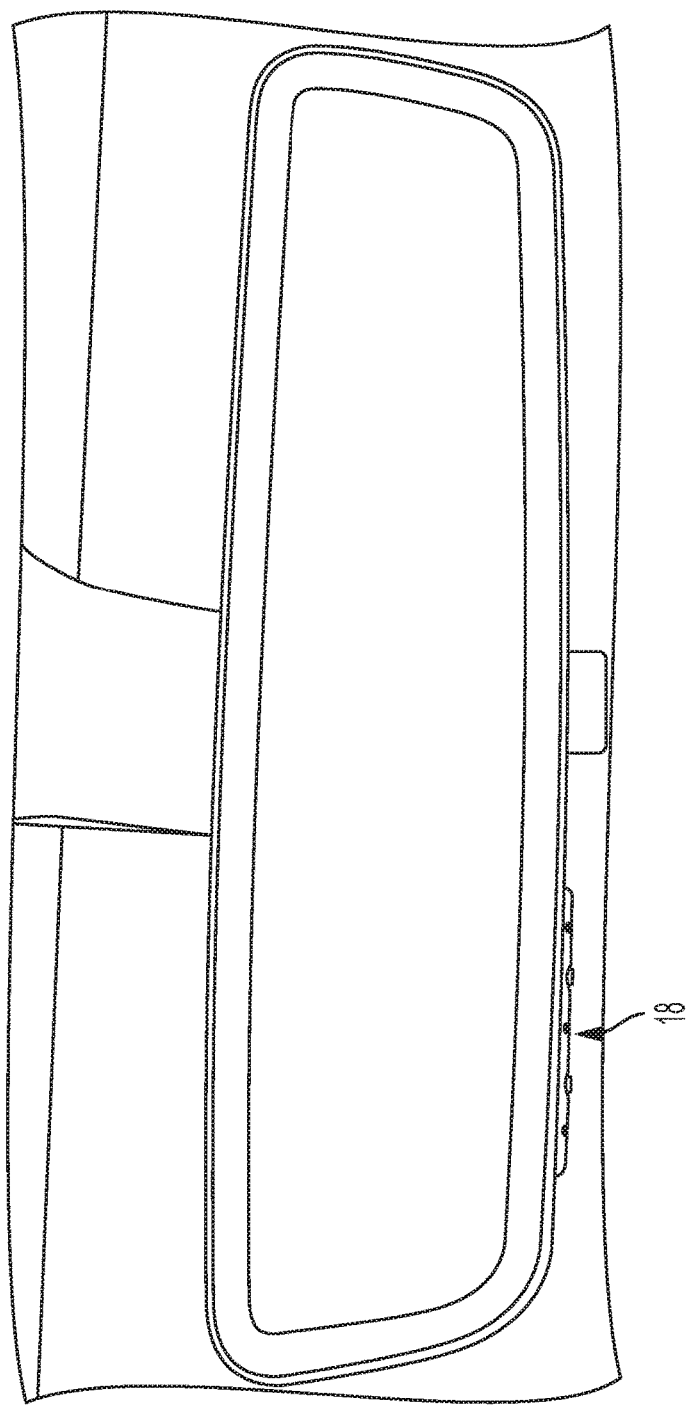
Figure 16:
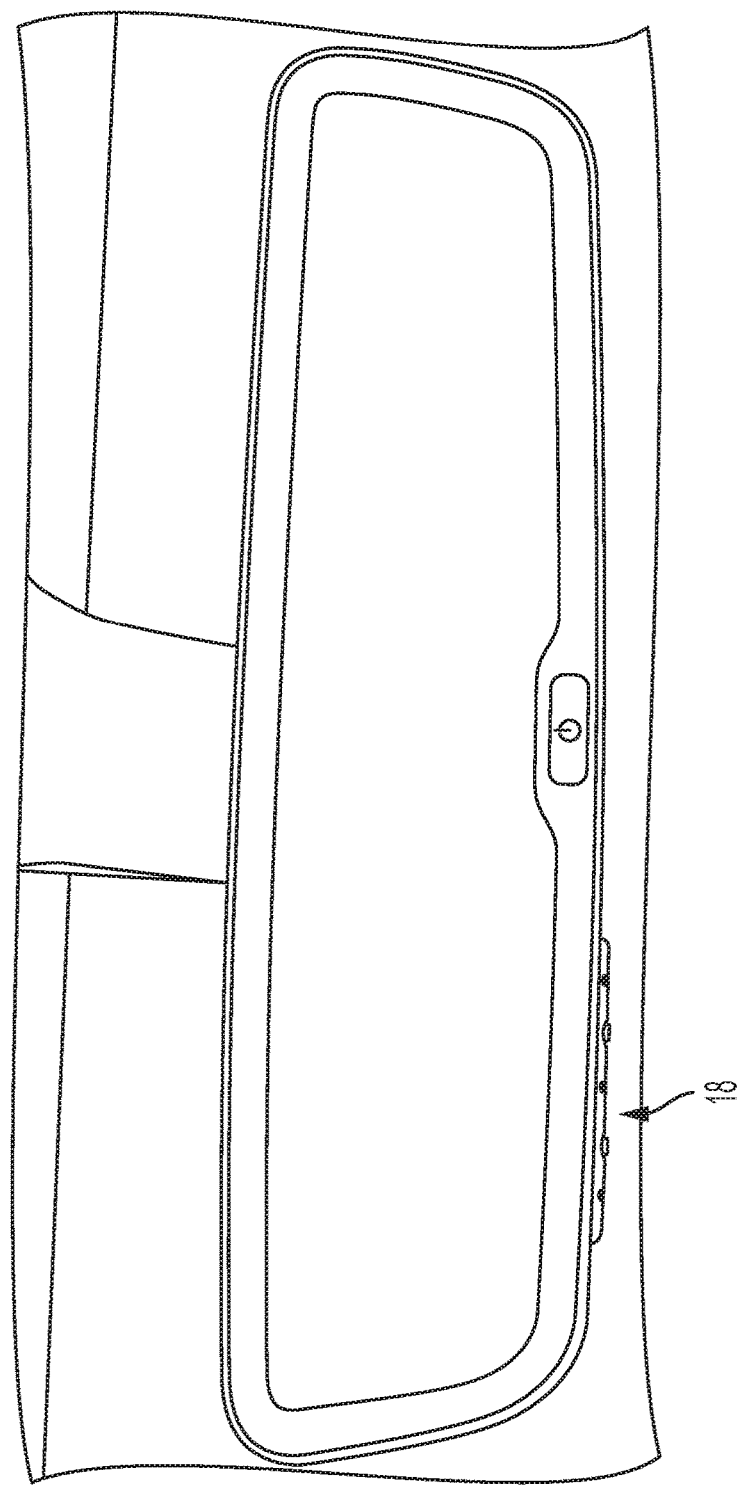

When disposed in the mirror assembly, the garage door opening module may protrude slightly from the mirror casing, such as can be seen with reference to FIGS. 12 and 13, whereby a user can readily see and discern the user-operable buttons of the module at the bottom of the mirror casing. The mirror assembly may comprise a prismatic mirror reflective element or an electro-optic mirror reflective element (such as an electrochromic mirror reflective element). Optionally, the mirror reflective element may comprise an electrochromic (EC) mirror reflective element having its EC on/off user input or button disposed at a bottom region of the housing (FIG. 14), where the EC or automatic mirror dimming input or button is at or near the buttons of the garage door opening module when the module is disposed in the mirror casing. Optionally, the automatic dimming control may be turned on or off by other user inputs, such as a flip switch (FIG. 15), which provides a toggle actuator similar to prismatic mirror elements (but with flipping of the toggle on the mirror of FIG. 15 turning on or off the automatic dimming control of the mirror instead of changing the position of the mirror reflective element or mirror head). Optionally, the user input for turning on or off the automatic dimming control may comprise any other suitable input, such as a touch sensor (FIG. 16) or the like disposed at or behind the mirror reflective element.

Figure 17:
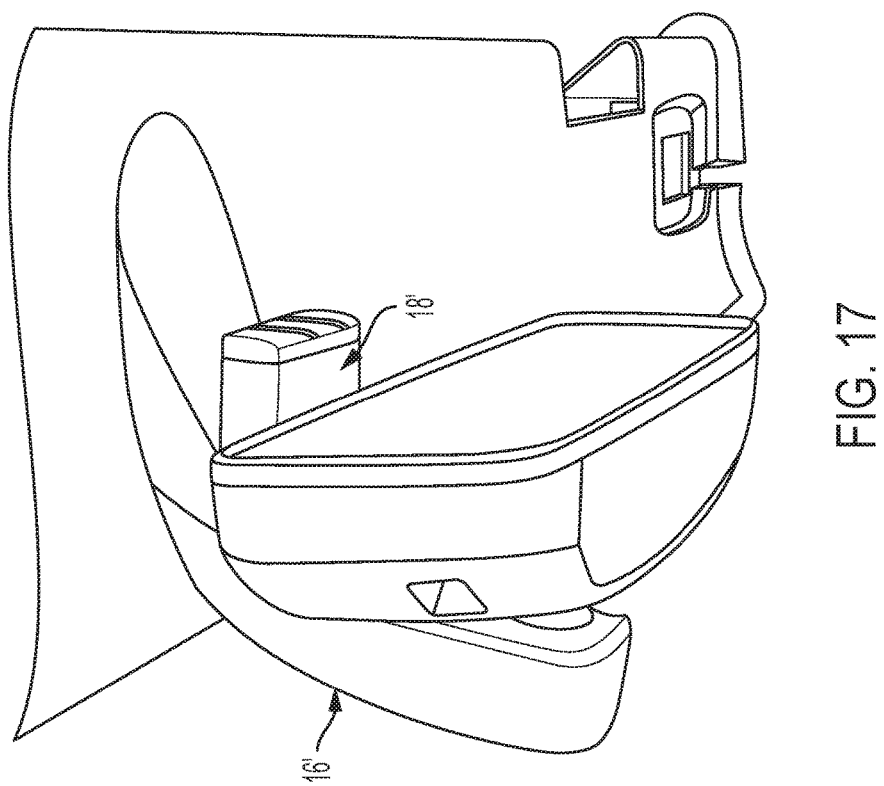
FIG. 17 is a perspective view of another interior rearview mirror assembly of the present invention, shown with a portable garage door opening module disposed at a mounting structure of the mirror assembly.
Figure 18:
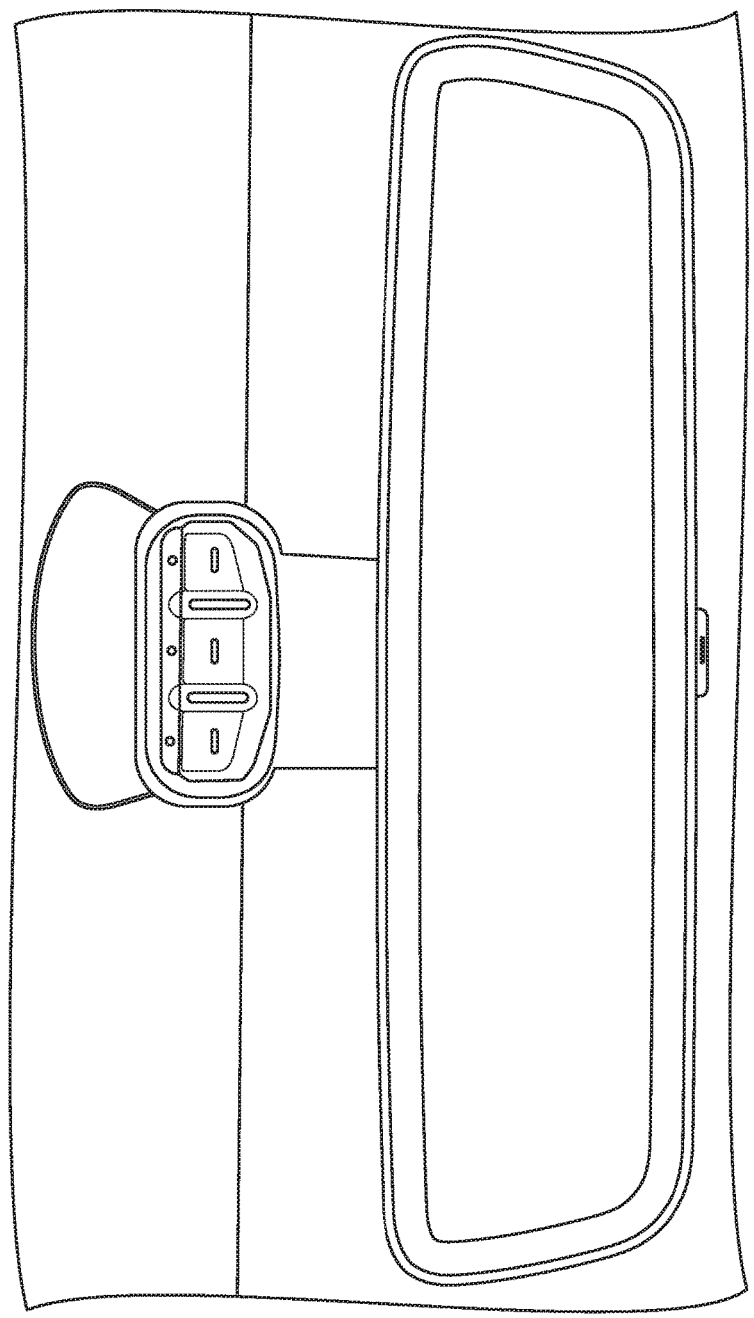
FIGS. 18-20 are plan views of interior rearview mirror assemblies having mounting structures similar to that of FIG. 17.
Figure 19:
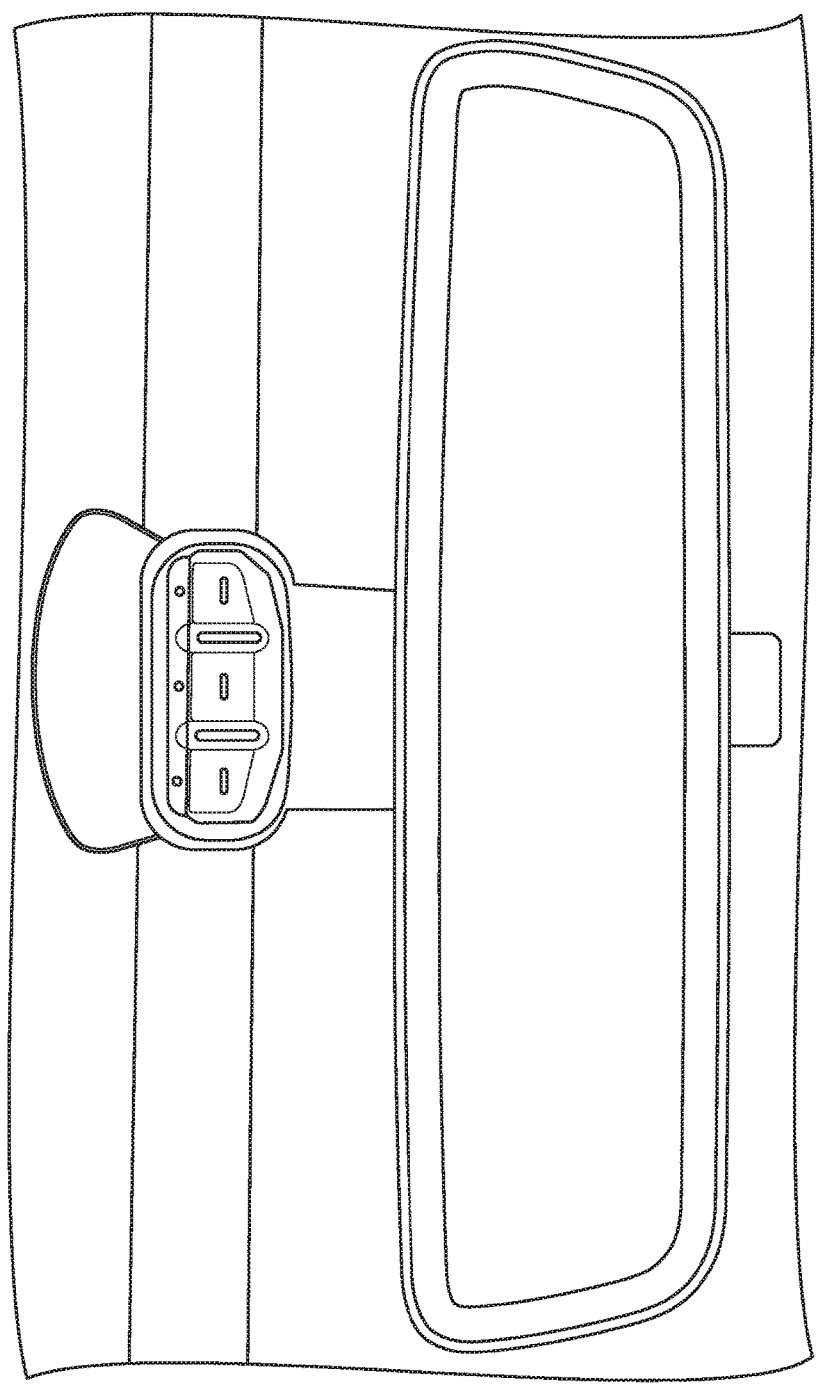
Figure 20:
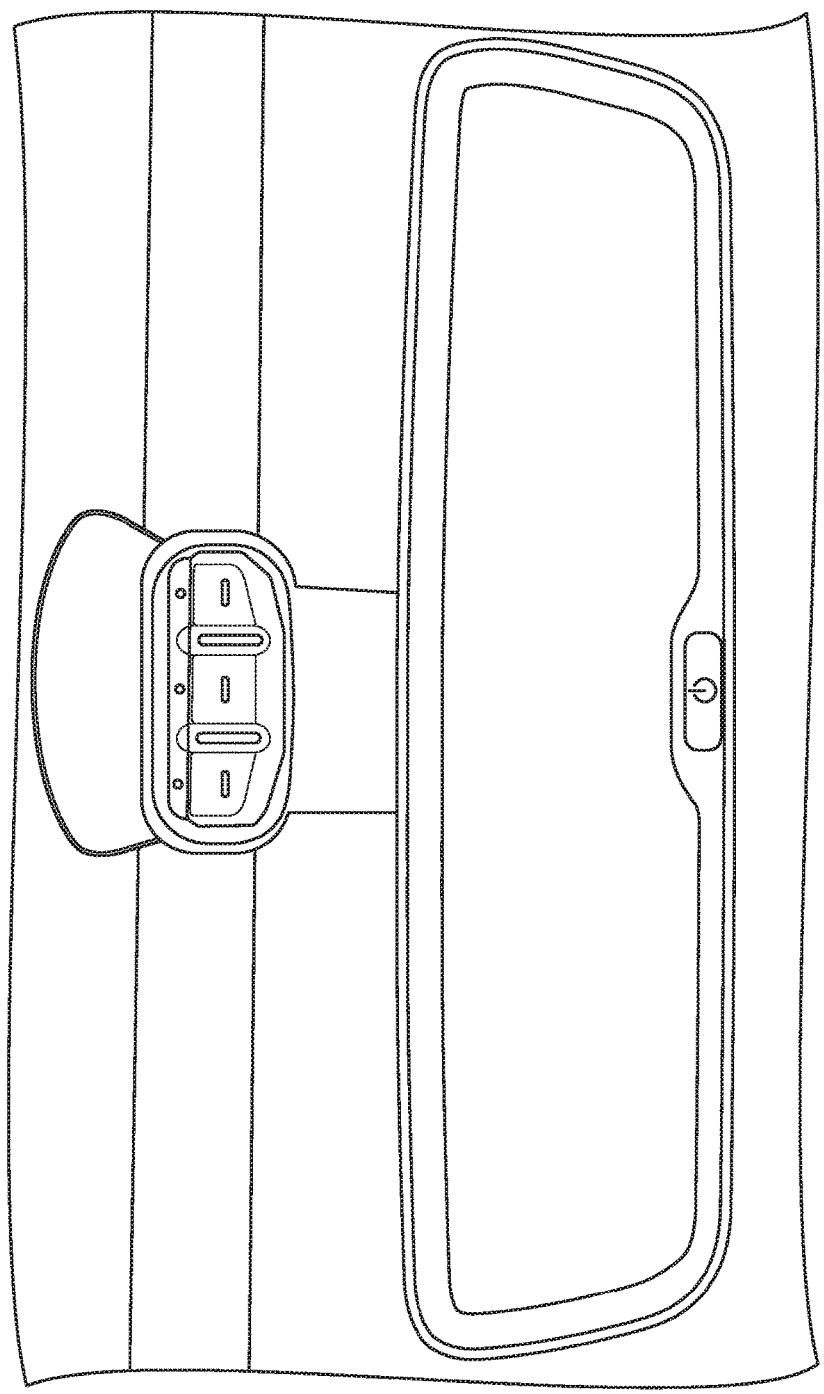

Optionally, the mirror casing of the mirror assembly of the present invention may not receive a garage door opening module, but the mirror mounting bracket or structure 16' (such as a bracket or structure that pivotally mounts the mirror head at a header of the vehicle such as shown in FIG. 17) may be configured to receive the garage door opening module 18' thereat, such as within or partially within the mirror casing of the mirror assembly or within or partially within the mirror mounting assembly or structure of the mirror assembly. In such a construction, the buttons of the garage door opening module are readily viewable and accessible above the mirror reflective element and mirror head, such as can be seen with reference to FIGS. 18-20. As shown in FIG. 17, the garage door opening module may be received in a recess of the mounting bracket and may protrude outwardly from the bracket so that the buttons are disposed generally above (and optionally protrude rearward of) the mirror reflective element, in order to ease access to the buttons when the garage door opening module is disposed at the mounting bracket. The mirror assemblies of FIGS. 18-20 show different optional user inputs for actuating or turning on/off the electro-optic mirror dimming control or feature, such as by a button at the bottom of the mirror casing (FIG. 18), a toggle switch at the bottom of the mirror casing (FIG. 19) or a touch sensor or proximity sensor at the mirror reflective element (FIG. 20).

Thus, the garage door opening module of the present invention is battery powered, such as lithium battery powered, with the battery integrated in the module. The circuitry of the module is operable by or powered by the integrated battery and operable to transmit one or more signals responsive to actuation of one or more of the user inputs or buttons of the garage door opening module. The garage door opening module may be separately obtainable separate from the mirror assembly as a self-contained unit or module. Thus, the mirror manufacturer provides a mirror having a recess or aperture and the mirror manufacturer merely accommodates or packages the garage door opening module in the mirror assembly. Preferably, a lithium ion battery (such as an Energizer CR2032 battery or a Tadiran TL-2450 battery or a Xeno XL-050F battery or the like) is used and the circuitry utilized is designed to minimize power and current utilization or consumption, so that the lithium ion battery need not be replaceable but can power the garage door opening module throughout utilization during the ten years or more life cycle of a vehicle. Operation of the garage door opening module is of course only during a desired garage door opening event and so use of the module is intermittent/sporadic and infrequent (such as, for example, only about two to four times a day or thereabouts), and only then the module operates for a very short period of time (such as a second or so when actuated to open or close the garage door). Thus, the garage door opening module of the present invention can be made compact with a lithium ion battery.

Because the garage door opening module is not powered by the vehicle battery (and is not embedded into or integrated in the vehicle wiring or electrical system), it is desirable to reduce the power consumption by the module. Thus, the garage door opening module may include features that assist in reducing the power consumption.

Optionally, the garage door opening module may be backlit or illuminated by a light source or LED that is separate and distinct from the garage door opening module and is not powered by the detachable self-contained battery operated garage door opening module. For example, the LED may be part of the interior rearview mirror assembly and may be disposed at the mirror assembly so that, when activated to emit light, the LED emits light that illuminates at least a portion of the garage door opening module when the garage door opening module is received at the receiving portion of the mirror assembly. In such a configuration, the interior rearview mirror assembly (at which the detachable self-contained battery operated garage door opening module is received) may incorporate and contain such a separate backlighting LED, with the separate LED being powered by the vehicle electrical system itself (and not by the battery of the detachable self-contained battery operated garage door opening module).

Optionally, it may be desirable that the garage door opening module include backlighting of the user inputs or buttons (and/or the user inputs or buttons may comprise blister switches or buttons or the like that provide a tactile feel including a raised or depressed button and a click feature when activated). The backlighting may be provided by an LED or the like. However, in order to reduce the power consumption, the module may utilize a glow in the dark material at least at its button regions. Thus, at night, the buttons would glow or would be illuminated to enhance visibility of the buttons. Such a non-electrical glow function does not require any battery power.

For example, the garage door opening module may provide a glow feature or luminescent feature to assist in viewing the module or at least the user inputs or buttons in low lighting conditions (instead of LEDs or the like). The button region of the module (and optionally the module casing) thus may comprise a highly visible and glowing phosphorescent material or the like. The garage door opening module (at least at the button region) may include an illumination source that comprises a self-luminous light source, which provides continuous illumination without a draw of current from a power source and with or without the need for periodic exposure to light. For example, the button or housing material (or an element disposed behind the button or in the module housing) may comprise a phosphorescent material, which is recharged in sunlight, or a self-luminous light source, which does not require light, such as sunlight, to charge. In contrast to self-luminous light sources, the illumination provided by phosphorescent and/or fluorescent materials decreases in intensity the longer the materials remain in a dark or dimly or sporadically lit area. A self-luminous light source provides substantially constant illumination intensity regardless of the surrounding lighting conditions. Preferably, the self-luminous light source is operable to provide light and intensity of at least approximately 5,000 micro-lamberts.

For example, the garage door opening module may comprise a self-luminous and self-sufficient light source, such as a Tritium gas capsule, which requires no light or electricity to charge and thus provides illumination, via radioactive decay of the elements, with no draw on the module's battery. The self-luminous light source may be disposed behind a transparent button region or at or near the buttons to provide illumination at or backlighting of the button region of the module. Tritium gas capsules are known and are available in various sizes, shapes, and colors, such as those commercially available from SRB Technologies Inc. of Winston-Salem, N.C. The Tritium gas capsules comprise an isotope of hydrogen which has a long operable life of at least approximately 12 years. These self-sufficient light sources comprise low levels of radioactive material, but are safe and have been approved for various consumer applications. A suitable self-sustaining light source is available from SRB Technologies Inc. of Winston-Salem, N.C. under the trade name Saunders-Roe Betalight®, and requires no electrical energy or light exposure to illuminate.

Thus, the garage door opening module of the present invention provides for button or icon illumination without vehicle wiring. Such wireless illumination may be suitable for use in door handles or other access systems, such as by utilizing aspects of the handle systems described in U.S. Pat. No. 6,485,081, which is hereby incorporated herein by reference in its entirety.

Optionally, the garage door opening module may include a molded plastic button with integral photo-luminescent material. An opaque paint with masked or etched icon graphic may also or otherwise be used to enhance visibility and discernibility of the button and its function. Optionally, an opaque molded plastic button with a second material added for a photo-luminescent icon may be used. For example, the icon may be 2-shot molded into the carrier button.

Optionally, the garage door opening module may include a molded substrate with layers of paint. For example, the substrate may comprise a "hard" plastic or a softer silicone or rubber material, with a photo-luminescent paint (undercoat) and an opaque paint top coat with masked or etched icon graphic.

Optionally, the photo-Luminescent material may require exposure to light for "charging." Because light with higher UV content works best, the light sensitive material may be exposed at or through the mirror housing (towards the windshield of vehicle). A visible light filter may be used at the housing to prevent glow of photo-luminescent material through the mirror housing, such that the illumination or glow is only visible when the garage door opening module is removed from the mirror housing.

Optionally, the garage door opening module may use an opaque paint that may be either a "positive" or "negative" image of the icon graphic. For example, with a positive image, only the icon glows, and with a negative image, the icon is dark, while the background glows.

Optionally, the photo-luminescent material may comprise any suitable material, such as an Alkaline Earth Metal Aluminate mixture (sometimes called Strontium Aluminate). Optionally, custom colors may be created with various metals (such as strontium, magnesium, calcium, and barium silicon and titanium). Optionally, the material may be doped with Europium or the like.

Optionally, the garage door opening module may use a small photo-voltaic solar cell to charge a capacitor or battery of the module. Optionally, an LED circuit may be used to illuminate the back side of a keypad. The LED circuit may utilize an internal ambient light sensor to activate LED circuits (thereby conserving energy until the backlighting function is needed).

Optionally, the garage door opening module may use or include a vibration mode energy harvesting system. For example, the system may include a battery or capacitor and vehicle vibration/motion may cause a piezo-electric system to store energy in the battery or capacitor. Optionally, an LED circuit may be used to illuminate the back side of a keypad. The LED circuit may utilize an internal ambient light sensor to activate LED circuits (thereby conserving energy until the backlighting function is needed).

Optionally, the garage door opening module may be trainable or universal garage door opening device such as utilizing known circuitry and protocols, or the garage door opening module may operate in accordance with or may be associated with a MyQ® garage door opening system or protocol commercially available from The Chamberlain Group, Inc. of Elmhurst, Ill. For example, the garage door opening module may operate in a system utilizing aspects of the systems described in U.S. Pat. Nos. 6,998,977 and/or 8,421,591, which are hereby incorporated herein by reference in their entireties. Optionally, the garage door opening module may utilize aspects of the vehicle based garage door opening systems described in U.S. Pat. Nos. 8,779,910; 8,577,549; 6,396,408; 6,362,771; 7,023,322 and/or 5,798,688, which are hereby incorporated herein by reference in their entireties.

When the garage door opening module of the present invention is used with a MyQ® or similar system, an internet gateway is utilized wherein the garage door opening module is in communication with the likes of a smart phone carried into the vehicle by an occupant (such as the driver or a passenger). The garage door opening module wirelessly communicates with such a smart phone or the like and the driver of the equipped vehicle may submit input (such as voice input or touch input or other user input) via the smart phone to the garage door opening module. The garage door opening module then wirelessly communicates or links with a MyQ® home module or unit located remotely from the vehicle, such as at the house or home of the driver where the subject garage door opener (that is to be remotely operated via the garage door opening module of the present invention) is located. Commands and/or information are thus wirelessly communicated (preferably via the internet/world wide web) to the remote-located MyQ® house/home module. Correspondingly, data as to the status (opened or closed) of the likes of the subject garage door at the subject house/home may be communicated from the house/home to the equipped vehicle via the internet/world wide web. Such a smart phone (or equivalent device) internet-gateway garage door opening system may be incorporated by the likes of Ford Motor Company into its SYNC® communication system. Alternatively, or in addition to smart phone utilization in the garage door opening system of the present invention, the likes of General Motors' ONSTAR® may incorporate the likes of a MyQ® garage door opener communication into the vehicle, with a garage door opening module (associated with the MyQ® system) preferably included in (and removable/detachable from) the interior rearview mirror assembly as described herein.

A distinct advantage of the ease with which the garage door opening module may be inserted into and removed from the mirror casing is that the vehicle owner or user can move the garage door opening module (and thus access to and control of his or her house/home garage door opener) from one vehicle to another vehicle. This portability enhances the utility and security of such a module. For example, and with the garage door opening module removed from the mirror assembly and vehicle, another driver of the vehicle (such as another family member, co-worker or the like) cannot remotely access the vehicle owner's (or prior user's) garage door opener or security barrier or home devices and/or the like when that person borrows or uses another person's vehicle. Also, when a person rents a vehicle or obtains a loaner vehicle when leaving his or her vehicle for service, that person can remove the garage door opening module from his/her own car—temporarily use it in the rental/loaner vehicle—and when his/her own vehicle becomes available again, reinsert the garage door opening module into his/her own vehicle.

A further distinct advantage of the ease with which the garage door opening module of the present invention may be inserted into and removed from the mirror casing (or from another portion of an interior rearview mirror assembly such as a foot or attachment portion thereof at or approximate where the interior rearview mirror assembly attaches to the windshield of the equipped vehicle via the likes of a mirror mounting button, such as known in the mirror mounting art) is that the garage door opening module (being portable and removable and not integrated into the interior mirror assembly) may be removed from the interior rearview mirror assembly when, for example, the vehicle is sold or when the vehicle is being valet parked or loaned or rented out or sent in for service at a service station/repair shop or the like.

The portability of the present invention has distinct advantages over prior known systems such as a trainable garage door opening system available from Gentex Corporation of Zeeland, MI under the trade name HOMELINK®. In the HOMELINK® trainable garage door opening system, the transmitter (and any associated buttons, receiver, antennae, circuitry and/or the like) is integrated into the vehicle and is powered by a power source of the vehicle (typically the vehicle's ignition/battery). For example, a HOMELINK® trainable garage door opening system is provided by Gentex integrated into an interior rearview mirror assembly that Gentex ships to a vehicle manufacturer/original equipment manufacturer (OEM) for installation by that OEM into a vehicle. As sold to and used by a buyer/consumer of a HOMELINK®-equipped vehicle, the trainable garage door opener is integrated into the vehicle and is not a user-removable, self-contained, portable, battery-operated garage door opening module of the present invention.

In accordance with the present invention, the garage door opening module is self-contained—all mechanical and electrical parts needed for operation are contained/packaged in a single unit. Thus, the battery, any user-operable buttons, the circuitry, antennae, casing and the like are provided in a unitary module or package. Thus, the owner of a vehicle equipped with the self-contained, battery-operated, portable, non-integrated garage door opening module of the present invention can, for example, remove the self-contained, battery-operated, portable, non-integrated garage door opening module from a mirror casing of the interior mirror assembly where it is housed when leaving the vehicle and may use the garage door opening module outside the vehicle or mount it into another vehicle (or replace the current garage door opening module with another updated garage door opening module). This portability is not possible with the known HOMELINK® system, where the garage door opening device is an integral part of likes of an interior mirror assembly or a visor and is not removable therefrom as a self-contained, portable unit. Thus, for example, if an owner of a vehicle equipped with a HOMELINK® system sells or scraps that vehicle, the HOMELINK® garage door opening device (being integrated into the vehicle) is sold with and goes with the vehicle.

The portability of the garage door opening module of the present invention has further advantages. An OEM manufacturer of automobiles can sell its vehicles equipped with an interior rearview mirror assembly that is configured to receive a self-contained, battery-operated, portable garage door opening module, but not actually include in that interior rearview mirror assembly the garage door opening module itself. Then the buyer of that vehicle can buy the garage door opening module from a store (such as a Menards store or a Target store or a Home Depot or a Lowes or the like) or buy the garage door opening module online from the likes of Amazon, and the owner of the vehicle can himself/herself install the garage door opening module into the interior rearview mirror assembly of the vehicle that is configured to receive that self-contained, battery-operated, portable garage door opening module. By not being integrated into the vehicle, the consumer can choose the best price and place to buy the garage door opening module, a distinct advantage over the integrated HOMELINK® systems currently used in vehicles where the HOMELINK® unit is not portable and where the consumer needs to buy the HOMELINK® feature when buying the subject vehicle, and thus must pay the price demanded by the OEM dealership (such as a Ford dealership or a GM dealership or a Toyota dealership) to buy the subject vehicle equipped with the HOMELINK® option.

A self-contained, battery-operated, portable garage door opening module suitable for use in the present invention is the Chamberlain 953EV Garage Door Opener Remote available from The Chamberlain Group Inc. of Elmhurst, Ill. The Chamberlain 953EV Garage Door Opener is for use with 315 MHz or 390 MHz garage door openers manufactured after Jan. 1, 1993. The battery-operated Chamberlain 953EV garage door opener activates when the programmed button in the remote control is pressed. The remote control can activate up to three garage door openers. Other self-contained, battery-operated, portable garage door opening modules are available from Chamberlain, such as Universal Clicker® Products. Chamberlain universal clicker garage door opener products are designed to work with a variety of garage door opener brands to give convenient, secure access to a garage or a home. They work with a variety of garage door opener models and frequencies. For example, the Clicker® Universal Remote Control Model KLIK1U (that can operate up to two different brands and/or frequencies of garage door openers) is a self-contained, battery-operated, portable garage door opening module suitable to use in the present invention.

Figure 23:
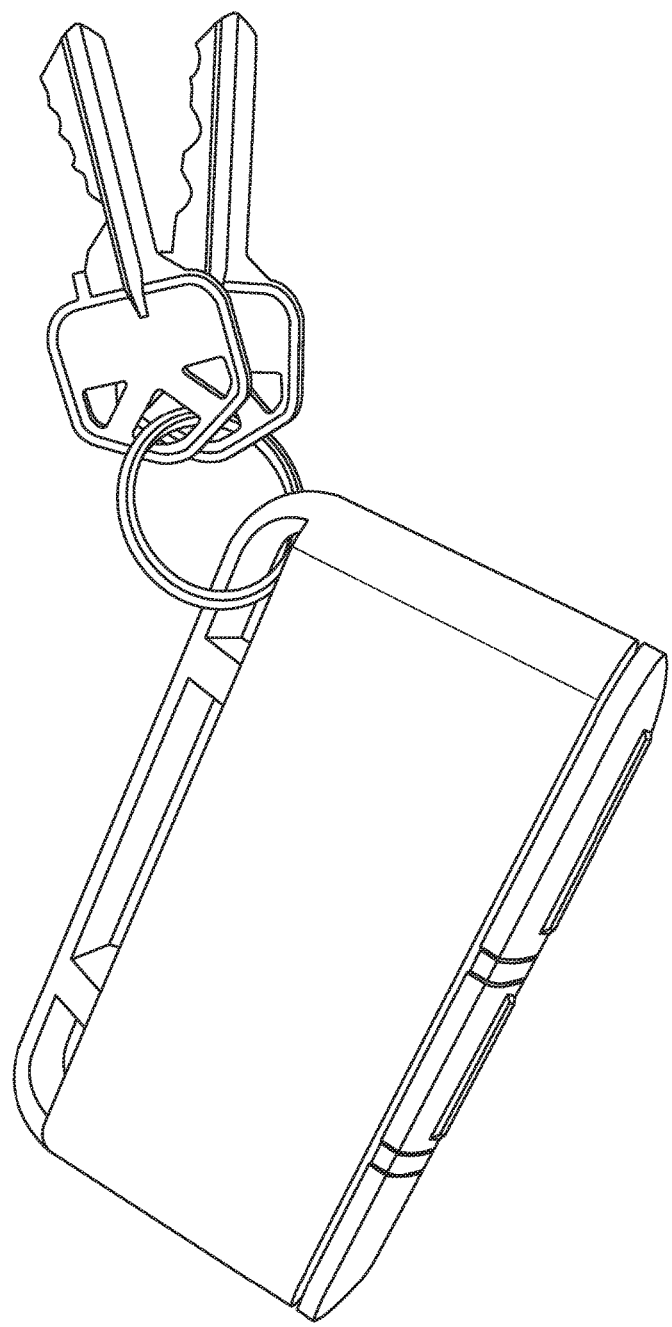
FIG. 23 is a perspective view of a portable garage door opening module of the present invention, shown with keys attached at the module.
Figure 24:
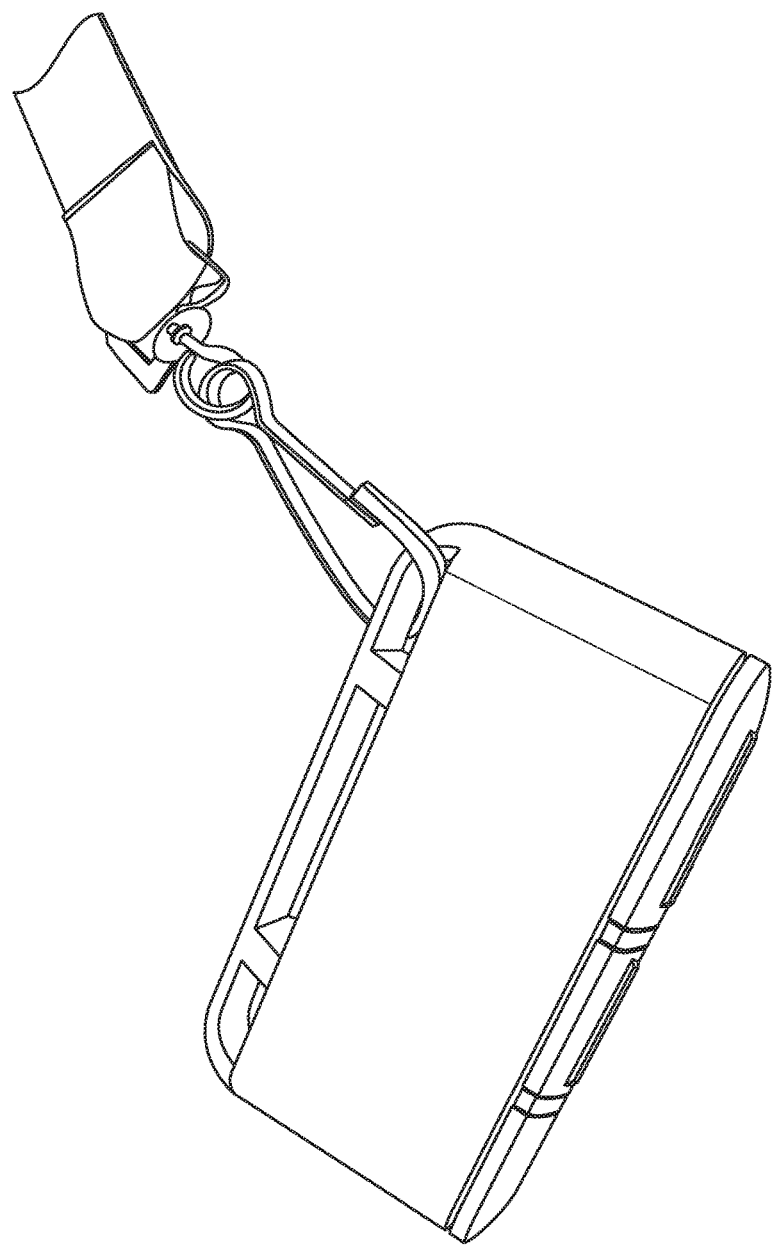
FIG. 24 is a perspective view of a portable garage door opening module of the present invention, shown with a lanyard attached at the module.
Figure 25:
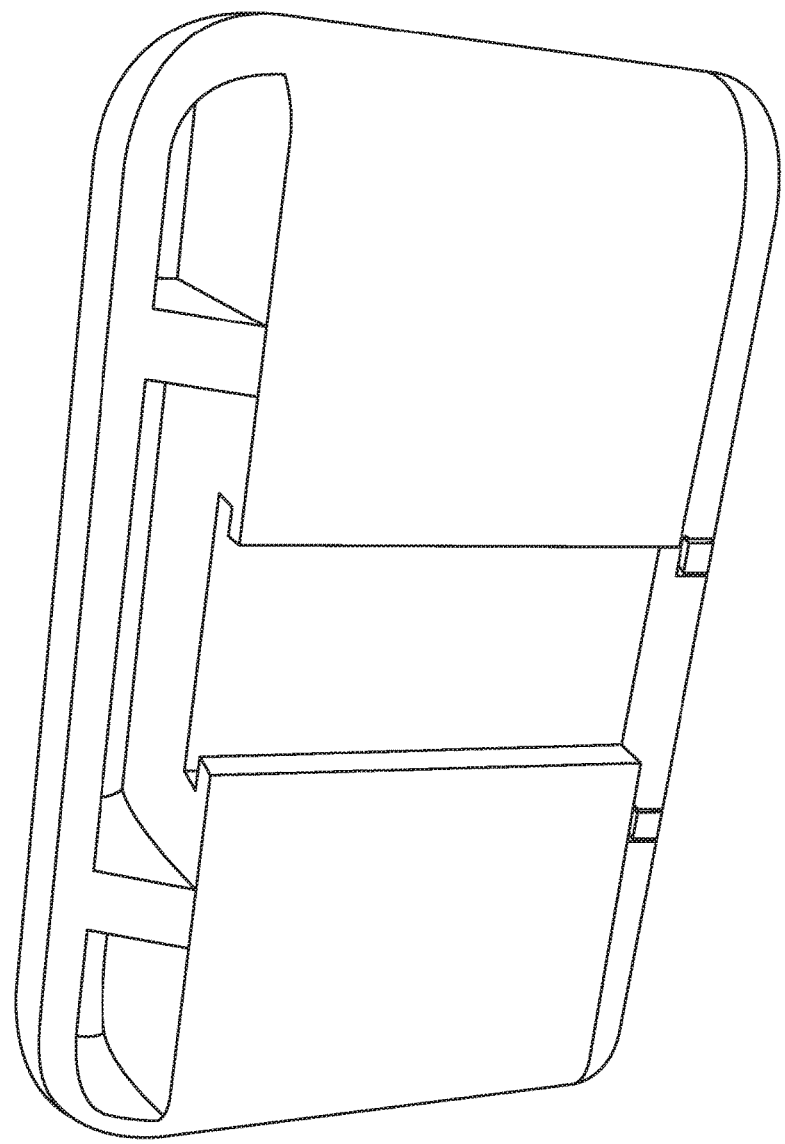
FIG. 25 is a perspective view of a portable garage door opening module of the present invention, shown with a latching slot along the module for engaging a corresponding attaching element of a mirror assembly to releasably secure the garage door opening module at the mirror assembly in accordance with the present invention.
Figure 26:
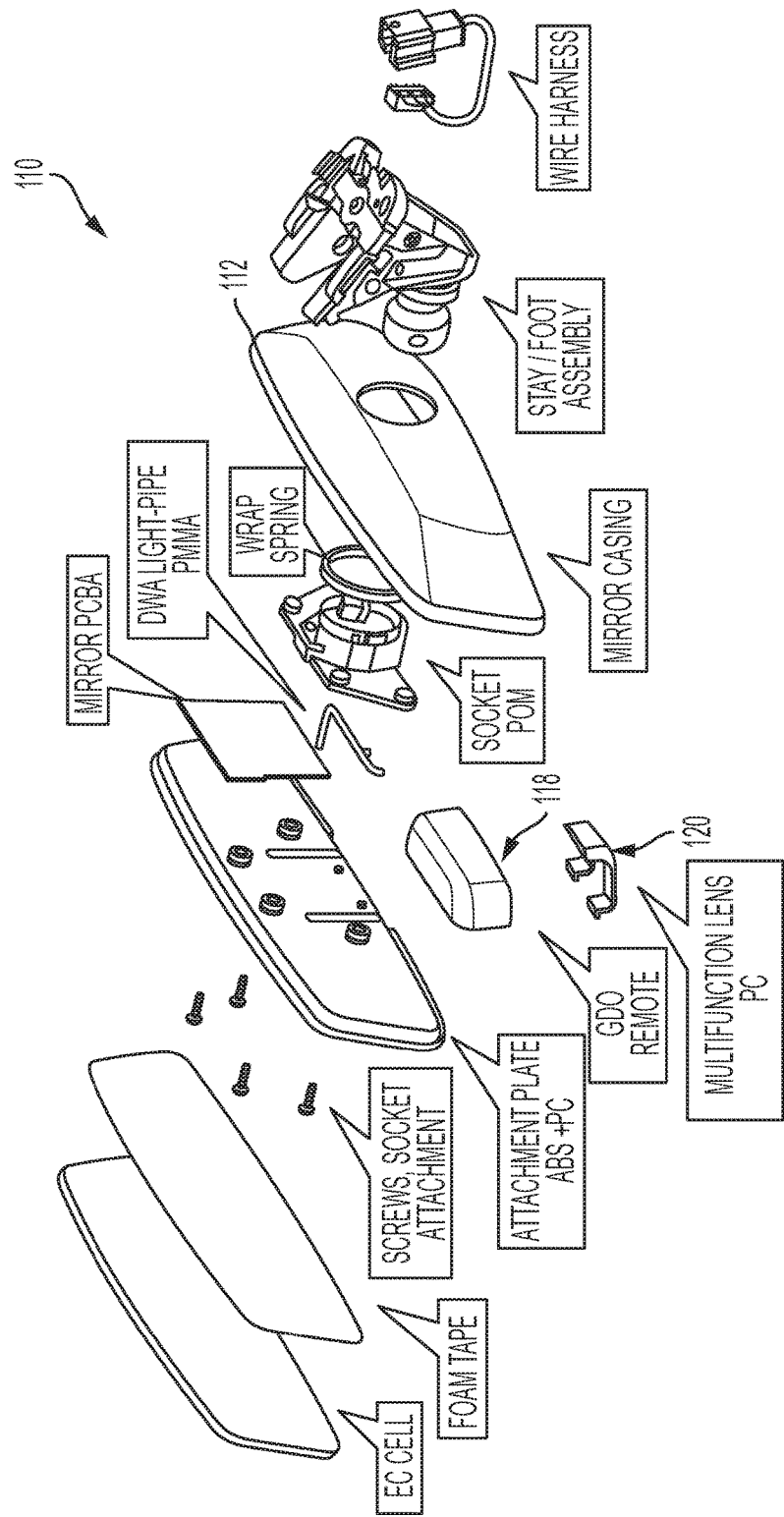
FIG. 26 is an exploded view of an interior rearview mirror assembly of the present invention, showing a garage door opening module with a lens or cover for covering a portion of the garage door opening module when the module is received at the mirror casing.
Figure 27:
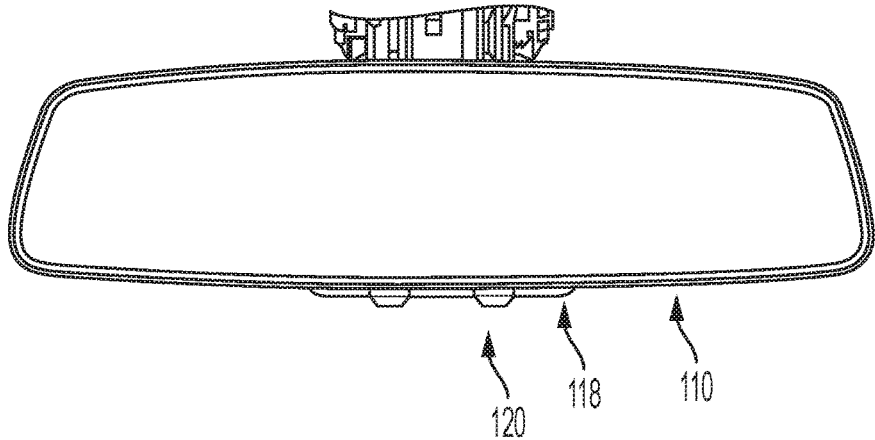
FIGS. 27 and 28 are perspective views of the interior rearview mirror assembly of FIG. 26.
Figure 28:
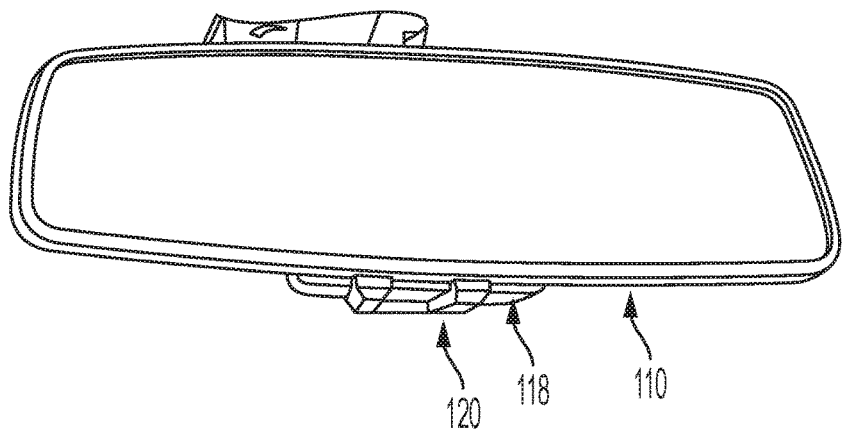
Figure 29:
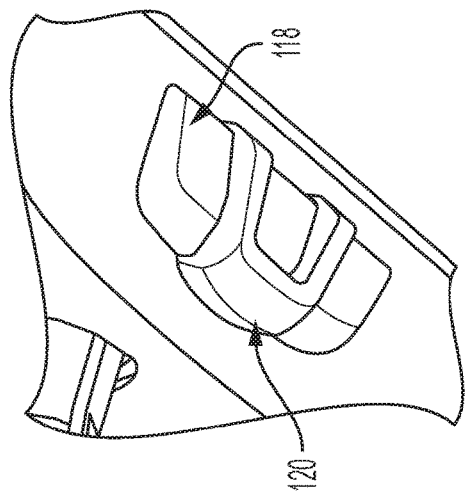
FIG. 29 is a perspective view of the underside of the mirror casing of the mirror assembly of FIGS. 27 and 28, showing the lens or cover disposed at the garage door opening module.
Figure 31:
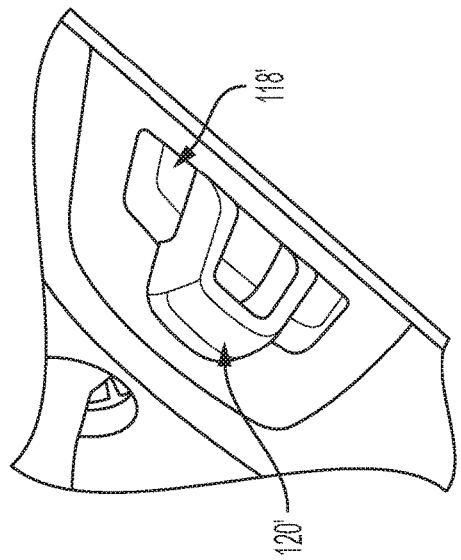
FIGS. 31 and 32 are perspective views similar to FIGS. 29 and 30, showing another lens or cover at a garage door opening module when the module is received at the mirror casing.
Figure 30:
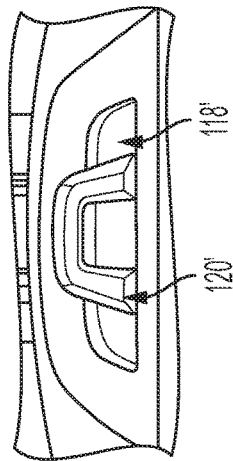
FIG. 30 is another perspective view of the underside of the mirror casing of FIG. 29.
Figure 32:
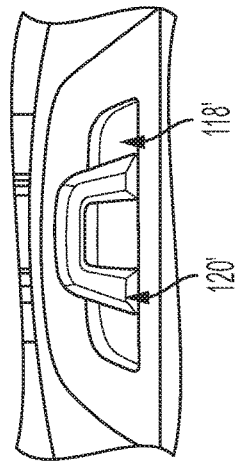
Figure 35:
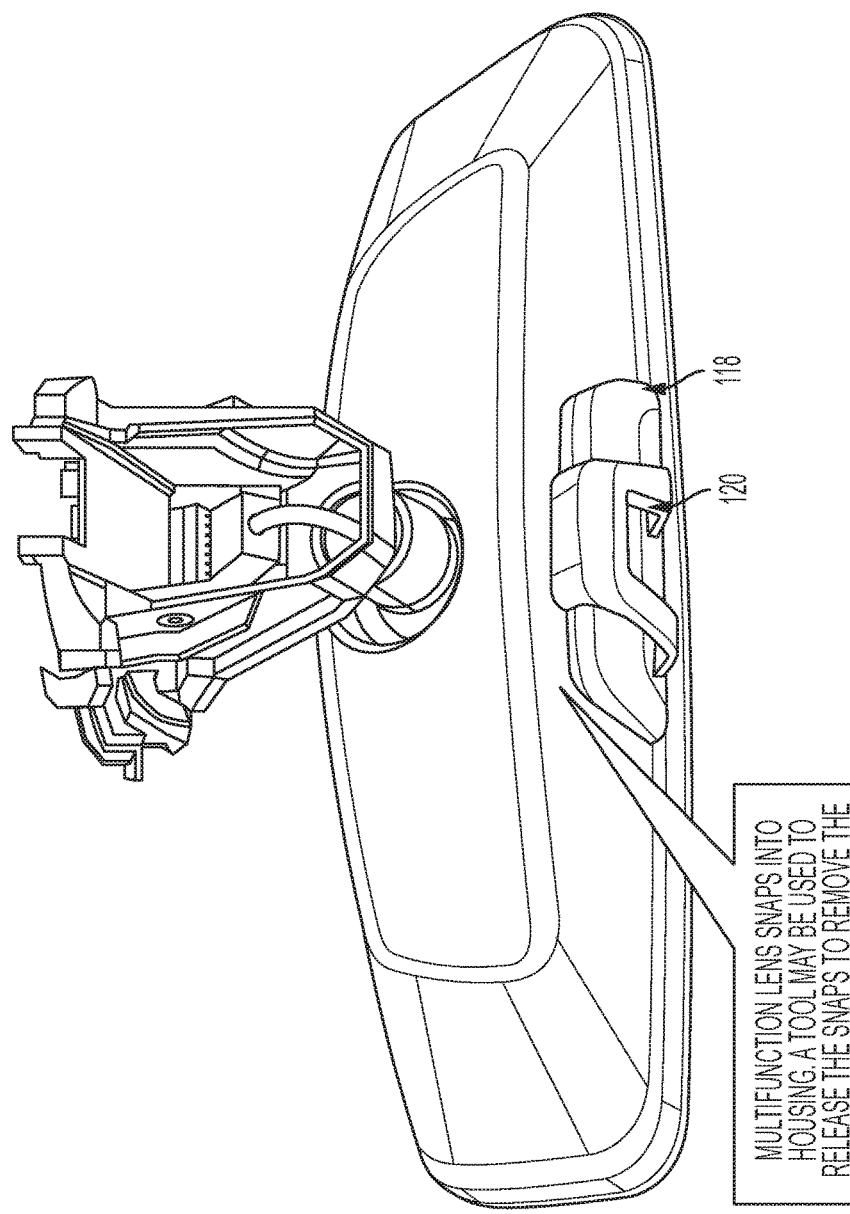
FIG. 35 is a perspective view of the mirror assembly and garage door opening module and lens or cover of FIG. 34, showing the module received at the mirror casing with the lens or cover attached at the mirror casing.
Figure 36:
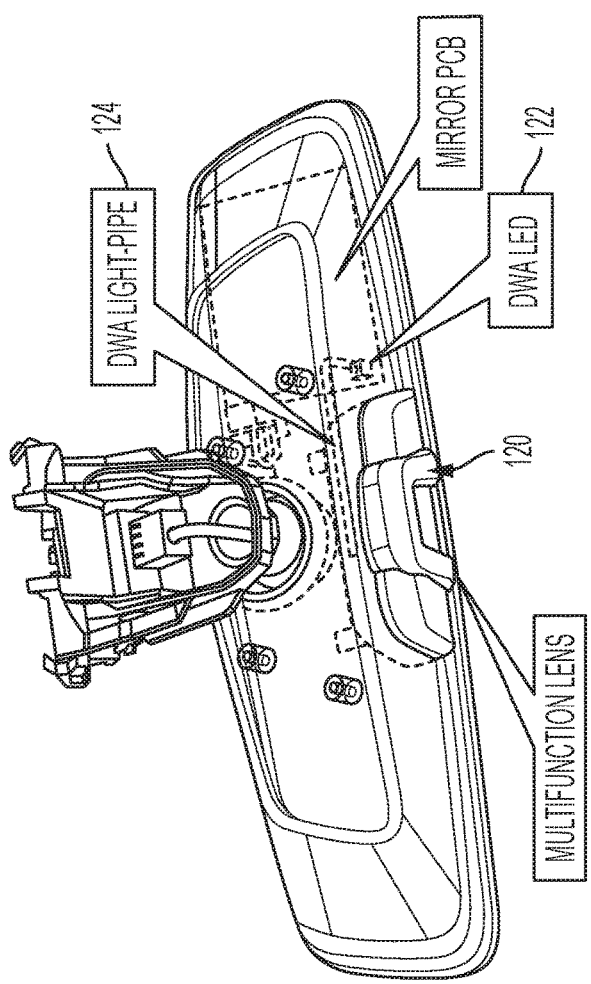
FIG. 36 is another perspective view of the mirror assembly of the present invention, showing a light pipe configured to guide light from a light source in the vehicle to the lens or cover.
Figure 37:
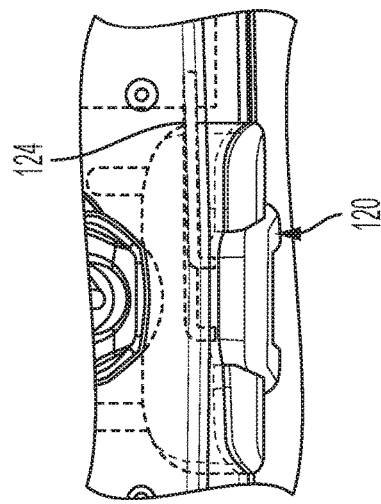
FIG. 37 is another perspective view of the light pipe and garage door opening module and lens or cover of FIG. 36.

As shown in FIGS. 21-24, the garage door opening module of the present invention may comprise such a Chamberlain product or circuitry. Optionally, the garage door opening module may comprise a symmetrical module to facilitate insertion of the module into the receiving portion of the mirror assembly in either direction, thus easing insertion of the module to a user of the garage door opening module of the present invention. Optionally, and such as shown in FIG. 25, the garage door opening module may include a slot along one or both sides for engaging a corresponding retaining element at the mirror assembly as the module is inserted into the mirror receiving portion to align and retain or secure the module at least partially within the receiving portion of the mirror assembly.

The self-contained, battery-operated, portable garage door opening module may include a key chain for attachment of keys when removed from the interior mirror assembly. For example, the garage door opening module may have attaching portions where keys or a lanyard may be attached (such as shown in FIGS. 23 and 24), to keep the garage door opening module with the keys or the like when detached from or removed from the mirror assembly.

Optionally, and with reference to FIGS. 26-39, an interior rearview mirror assembly 110 includes a receiving portion 112a for receiving a portable self-contained battery powered garage door opening module 118 thereat. A lens or bezel or cover 120 is provided that attaches at the mirror casing 112 to retain or secure the garage door opening module 118 thereat when the module is at least partially received at the receiving portion of the mirror casing. The lens or cover may provide a multifunction lens that functions as a clip or retainer for retaining or securing the garage door opening module at the receiving portion of the mirror casing (such as by snap-attaching at the mirror casing at the module), and that may also function as an illumination source or alert, as discussed below.

As best seen in FIGS. 29-32, the lens or cover 120, 120' may be formed to conform with or correspond with the lower surface of the garage door opening module, such that, when the lens or cover is attached at the mirror casing, the lens or cover engages and retains or secures the module securely or firmly at the receiving portion. The lens or cover 120' (FIGS. 31 and 32) is configured to engage and retain or secure a different shaped lower portion of a garage door opening module 118' than lens or cover 120, but is otherwise generally similar to the lens or cover 120, such that a detailed discussion of lens or cover 120' need not be repeated herein.

Optionally, the multifunction lens or cover 120 may comprise an alert or illumination element that may be illuminated via a light source 122 within the mirror assembly (such as a light emitting diode at a circuit board in the mirror casing). For example, and such as can be seen with reference to FIGS. 26 and 36-38, a light pipe 124 may be used to guide or direct light emitted by a light emitting diode 122 (LED) to the lens 120, whereby, when the LED is activated or energized, the lens 120 is illuminated. The LED may be activated responsive to any signal or input. Optionally, for example, the LED 122 may be associated with anti-theft system of the vehicle, whereby the anti-theft warning light or LED 122 may be actuated when an anti-theft system of the vehicle is actuated (such as when the doors are locked), and the lens 120 thus may glow or emit light (such as responsive to a short pulse of light emitted by the LED 122) to indicate to a person viewing the vehicle from outside that the anti-theft system is activated. The lens may be designed to spread or emit light 360 degrees to signal to people outside of the vehicle and around the vehicle that the anti-theft system is activated.

Optionally, the LED 122 (or another LED or light source within the mirror casing) may be activated to provide illumination at the lens or cover 120 for other functions or features. For example, the LED may be actuated to provide illumination at and around the lens or cover 120 to enhance visibility and viewability of the garage door opening module and its button or buttons in low lighting conditions. The LED may be responsive to a user input or ambient light sensor so that the LED may be activated when lighting conditions are low or below a threshold level, or when the user selectively actuates the LED to enhance viewability of the garage door opening module.

The lens may be designed to direct light towards the buttons of the garage door opening module, or the lens may be configured to diffusely glow to illuminate the region where the garage door opening module is disposed, or optionally the lens may be configured to emit or project low level illumination downward towards the dashboard or center console of the vehicle. Optionally, the lens may be configured to project light or illuminate a graphic or icon etched or otherwise established at the lens (such as at a surface of the lens) to backlight or highlight the graphic or icon. The LED may comprise any suitable light emitting diode or light source, such as a white light-emitting light emitting diode or other colored LED, such as for customizing the appearance by an OEM, whereby such customized light may match or contrast or harmonize with the other lighting within the vehicle.

Figure 38:
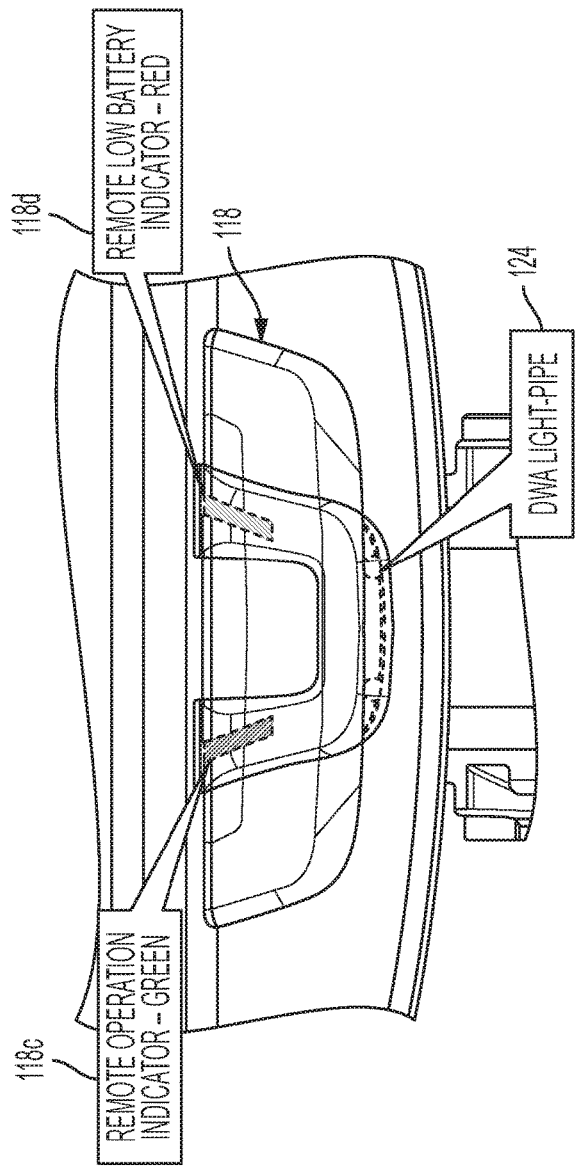
FIG. 38 is an enlarged view of the lower region of the mirror casing and garage door opening module and les or cover and light pipe of the present invention.
Figure 39:
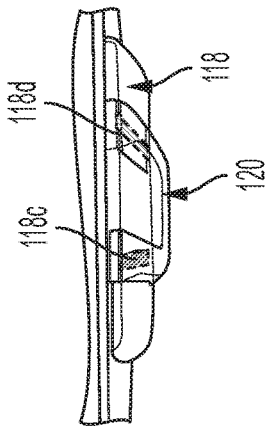
FIG. 39 is another perspective view of the lower region shown in FIG. 39.

Optionally, and such as shown in FIGS. 38 and 39, the portable self-contained battery operated garage door opening module 118 may include an operation indicator 118c (such as a green indicator or LED or the like) that is energized when the garage door opening module is actuated (such as by a user pushing upward at the lens or at a button of the module when the module is received at the receiving portion of the mirror casing). The lens 120 may be configured to be disposed over the indicator 118c when the lens is attached at the mirror casing to retain or secure the module at the mirror casing, whereby light emitted by the indicator 118c passes through the lens (which may comprise a generally transparent or translucent or tinted or colored or diffuse plastic or polycarbonate element) so as to be viewable and discernible by the user of the garage door opening module. Optionally, the self-contained battery operated garage door opening module 118' may include a battery indicator 118d (such as a red indicator or LED or the like) that is energized when the battery level or charge of the battery of the garage door opening module is low or below a threshold level. The lens 120 may be configured to be disposed over the indicator 118d when the lens is attached at the mirror casing to retain or secure the module at the mirror casing, whereby light emitted by the indicator 118d passes through the transparent or translucent or tinted or colored or diffuse lens so as to be viewable and discernible by a person viewing the mirror assembly and garage door opening module.

Optionally, the multi-function lens may be painted with laser etching to enhance the driver's or passenger's ability to locate the buttons of the garage door opening module. The laser etching may allow for lighting of symbols or icons or areas. The lens may be substantially proud or above the surface of the buttons to further assist the user in identifying the desired button, such as via visual identification or touch.

Optionally, the lens may provide an alternate function as a warning indicator that draws the driver's eye and attention to the lens and mirror. For example, the lens may be illuminated or may flash or the like responsive to a vehicle system that determines when a rear collision is imminent or likely, so that the driver may look at the mirror and see the rearward approaching vehicle and may maneuver the vehicle to avoid or mitigate the rear collision. Optionally, the lens may be illuminated or may flash responsive to a determination that the driver of the equipped vehicle is approaching another vehicle too quickly or is following too close behind a leading vehicle. Optionally, the lens may be illuminated or flash responsive to a detection of an object in or near the path of travel of the vehicle, such as during a reversing maneuver or parking maneuver of the vehicle. The lens thus may be illuminated or flashed responsive to various vehicle safety or vision systems, such as forward viewing camera systems or rearward viewing camera systems of the vehicle or surround viewing camera systems of the vehicle. Optionally, the lens may provide a decorative cover, with the lighting function accomplished via the internal light source and light pipe discussed above. The cover thus may have more of a structural design and may not be limited in its design for the requirements of lighting. The cover thus may be designed for locking or securing the self-contained, battery-operated, portable garage door opening module at the receiving portion of the mirror assembly, whereby, when attached at the mirror casing, a portion of the cover interfaces with or abuts or is disposed near an end of the light pipe to receive light therefrom when the light source at the opposite end of the light pipe is actuated, such as in the manner or manners discussed above.

When housed in an interior rearview mirror assembly, the self-contained, battery-operated, portable garage door opening module suitable to use in the present invention is mechanically received at the interior rearview mirror assembly without need to make any electrical connection thereto from the interior rearview mirror assembly itself and/or from any vehicle ignition/battery power source. Thus, the present invention well suits lower-cost, non-electrified prismatic day/night mirrors that mount to a mirror mounting button adhered to an in-cabin surface of the vehicle's windshield but that are not electrically connected to an electrical power source of the vehicle. The portable garage door opening module of the present invention being self-contained and battery-powered, it can be accommodated into an interior rearview mirror assembly and the OEM need not provide an electrical wire harness/connector to provide vehicle electrical power to the interior mirror assembly, thus reducing overall system cost and complexity.

The manufacturer of the interior rearview assembly (such as, for example, Magna Mirrors of America Inc. of Holland, Mich.) may coordinate with the manufacturer of the portable garage door opening module (for example, The Chamberlain Group of Elmhurst, Ill.) so that the portable unit is securely received by the interior mirror assembly and is readily user-removable therefrom. The interior mirror assembly manufacturer can provide a slot in the lower surface of the mirror casing (or any other surface such as a top or a side surface) and also may provide receiving structure within the cavity of the mirror casing that cooperates with structure of the portable garage door opening module so that, having purchased the portable garage door opening module online or at a store, an occupant of a vehicle equipped with that interior mirror assembly can simply insert the module via the opening provided into the mirror casing and the inserted module snaps in or otherwise mechanically secures in the cavity of the mirror casing until a user desires to remove it therefrom. Such a slot, being such as at the lower surface of the mirror casing or housing, is relatively unobtrusive and non-viewable for a vehicle occupant (such as the driver). Optionally, a flap or flaps or similar structure can be provided to close over the gap in the outer surface of the mirror casing created by the slot present for user-insertion of the module/unit and present for removal of the module.

Optionally, additional features may be added to external display systems and/or to the garage door opening module or mirror assembly. For example, triggering the radio frequency (RF) transmitter of the detachable self-contained battery operated garage door opening module based on vehicle commands or geographical location. Also, on-screen instructions to help the driver with training of the clicker module. This may require the portable garage door opening module to be "listening" for some signal from the vehicle, as opposed to only activating with a button press.

Optionally, a BLUETOOTH® RF radio may be used for some fixed code programming situations (such as BLUETOOTH Low Energy or BTLE). BTLE consumes too much power and would drain the battery too quickly if left active at all times. Thus, the system of the present invention may utilize other sensors as a means to wake-up the portable garage door opening module, and maintain the battery life-time.

There are options that are lower power than the BTLE radio communication, if left continuously active. Optionally, an accelerometer (such as an accelerometer device that has a low power modes with ability to "wake" upon detecting an acceleration above a programmable threshold, where "low power" means less than 10 µA, with some options below 1 µA) may be used that is triggered on door slam or engine start (whereby an output of the triggered accelerometer is used to turn on or wake up the portable garage door opening module. Optionally, a light sensor (such as for sensing visible or IR wavelengths) or a magnetic or magnetoresponsive sensor (Hall Effect Sensor) may be used where an output of the sensor may turn on or wake up the portable garage door opening module. After a wake-up event by one or more sensors, the portable garage door opening module could verify/confirm status using the BTLE link with circuitry or a controller of the mirror assembly or vehicle.

The portable garage door opening module of the present invention can be a member of a suite of portable modules, another of which can be a portable light module (that when being housed in the mirror casing and used in the vehicle can provide likes of a map reading functionality and when removed and used outside the subject equipped vehicle can function as a flashlight. For example, and with reference to FIGS. 10 and 11, a light module 21 of the present invention may be received in a receiving portion 12a' of the mirror assembly (which may have two or more receiving portions for receiving and releasably retaining or securing two or more separate modules), and may be removable therefrom. When in the receiving portion of the mirror assembly (FIG. 10), the light module may function as a map reading light, and when removed from the receiving portion of the mirror assembly (FIG. 11), the light module may function as a portable handheld flashlight. Preferably, the battery-operated light comprises at least one white light emitting light emitting diode as its light source.

The self-contained, battery-operated, portable garage door opening module of the present invention may comprise a speaker/microphone module that allows hands-free communication (preferably using voice activation and control) with a phone or other device within the cabin of the equipped vehicle, such as via use of a Bluetooth short-range RF communication protocol.

Figure 40:
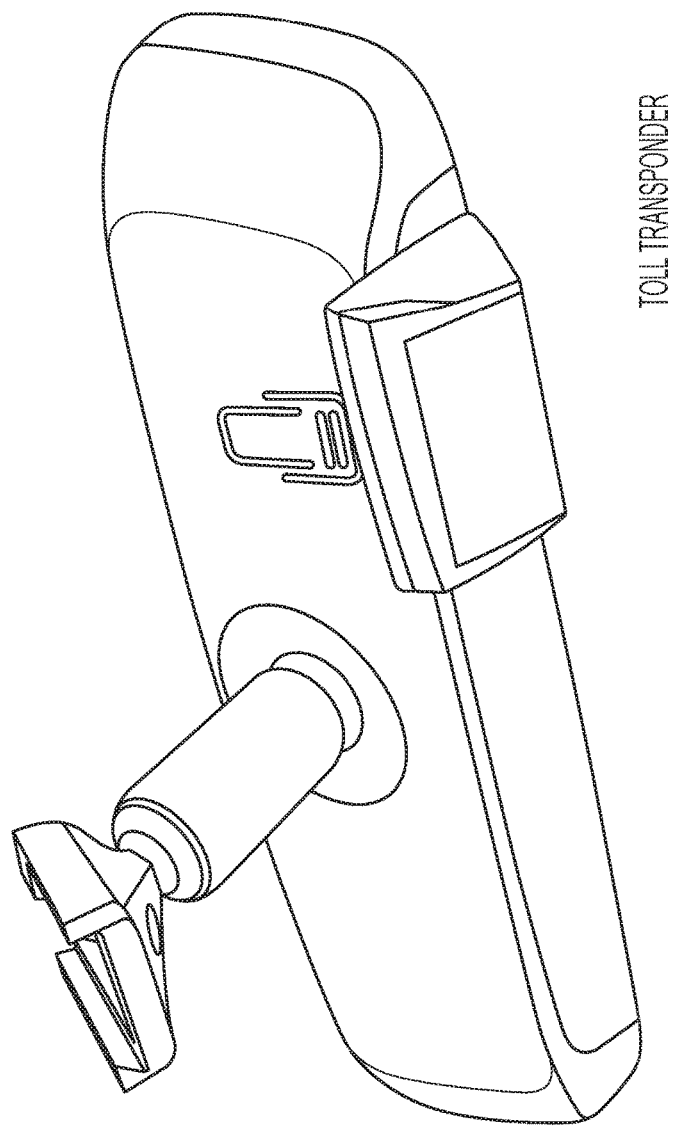
FIG. 40 is a perspective view of an interior rearview mirror assembly with a portable toll transponder module in accordance with the present invention.

The suite of portable modules may include a variety of self-contained, battery powered modules. For example, the module may comprise a toll transponder (FIG. 40) that communicates with automated toll systems, such as an E-ZPass® toll-both transponder, so that a user can readily insert their paid for toll transponder into the rearview mirror assembly of their own vehicle or a rental vehicle or the like. E-ZPass® is an electronic toll-collection system used on most tolled roads, bridges, and tunnels in the northeastern United States, south to North Carolina, and west to Illinois. Currently, there are 25 agencies spread across 14 states that make up the E-ZPass® Interagency Group (IAG). All member agencies use the same technology, allowing travelers to use the same E-ZPass® transponder throughout the IAG network. Various independent systems that use the same technology have been integrated into the E-ZPass® system. These include I-Pass in Illinois and NC Quick Pass in North Carolina. Other interoperable systems retained their own branding for some time, but have all since been rebranded simply as E-ZPass®.

Optionally, the detachable self-contained battery operated garage door opening module may comprise a radar detector, and may include circuitry to generate an audible or visual alert to the driver of the vehicle when a radar is detected. The visual alert (such as one or more LEDs or the like) may be viewable at an exposed portion of the module at the lower region of the mirror casing, or may be viewable through the mirror reflective element of the mirror assembly.

Figure 41:
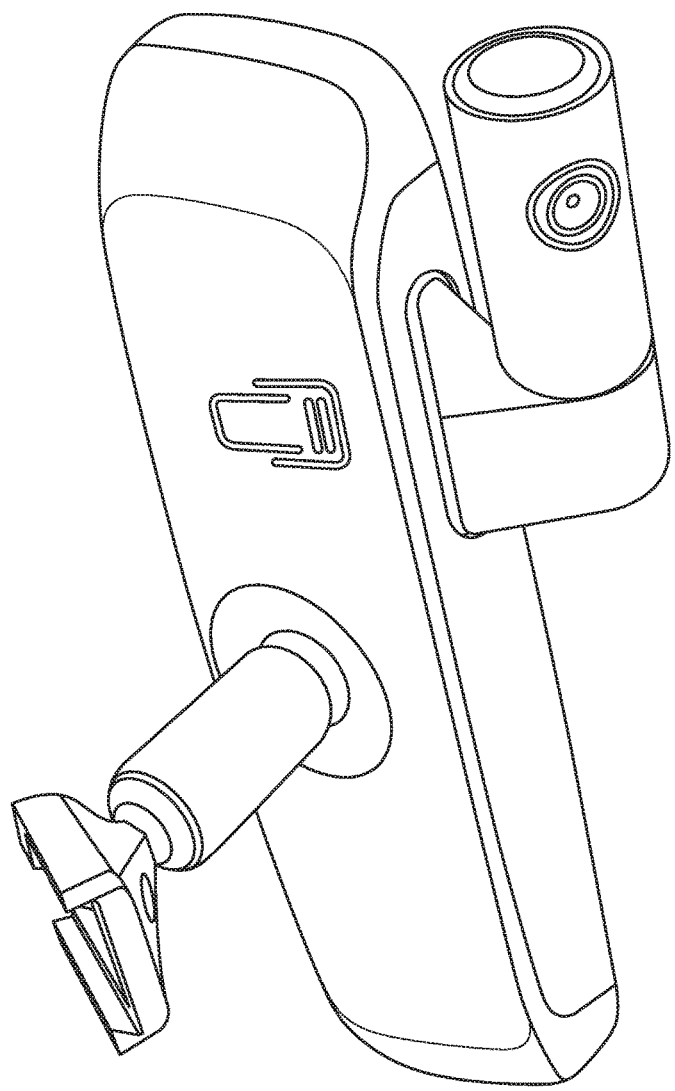
FIG. 41 is a perspective view of an interior rearview mirror assembly with a portable camera module in accordance with the present invention.

Optionally, and with reference to FIG. 41, the self-contained, battery powered garage door opening module may comprise a driver camera system or vision system, whereby, when inserted into the mirror assembly, a camera of the module may view forwardly of the vehicle through the windshield (such as for providing a lane departure warning system or the like) or may view into the cabin of the vehicle (such as for an in-cabin monitoring system or the like). The module may include circuitry for processing captured image data and for generating an output, such as an audible alert or a visual alert (that may be viewable through the mirror reflective element), responsive to such processing (such as to alert the driver of the vehicle when the vehicle is leaving its lane of traffic). Optionally, the module may include a display screen that is viewable through the reflective element. Optionally, the module may include a transmitter that wirelessly communicates a signal, such as to a network bus of the vehicle or the like. When removed from the mirror assembly, the camera module may function as a handheld video camera and/or still camera.

Another of the suite of portable modules can be a portable battery-operated digital note taker/digital voice recorder that includes a microphone and digital recorder for recording notes or messages or the like while driving—and when removed from the interior mirror assembly and carried by a user outside the vehicle can be used as a digital voice recorder outside of the vehicle such as in an office or home. Another of the suite of portable modules can be a portable memory stick for storing computer data and the like.

Figure 42:
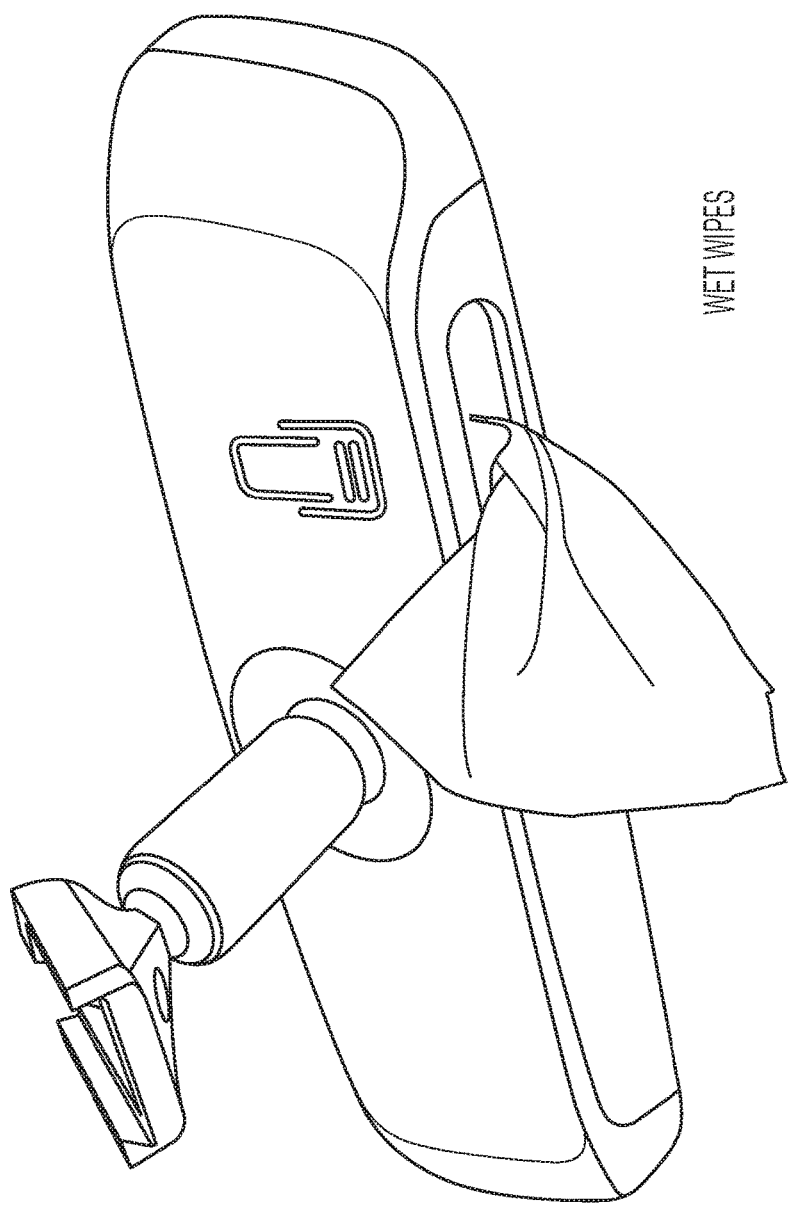
FIG. 42 is a perspective view of an interior rearview mirror assembly with a portable wet wipes module in accordance with the present invention.
Figure 43:
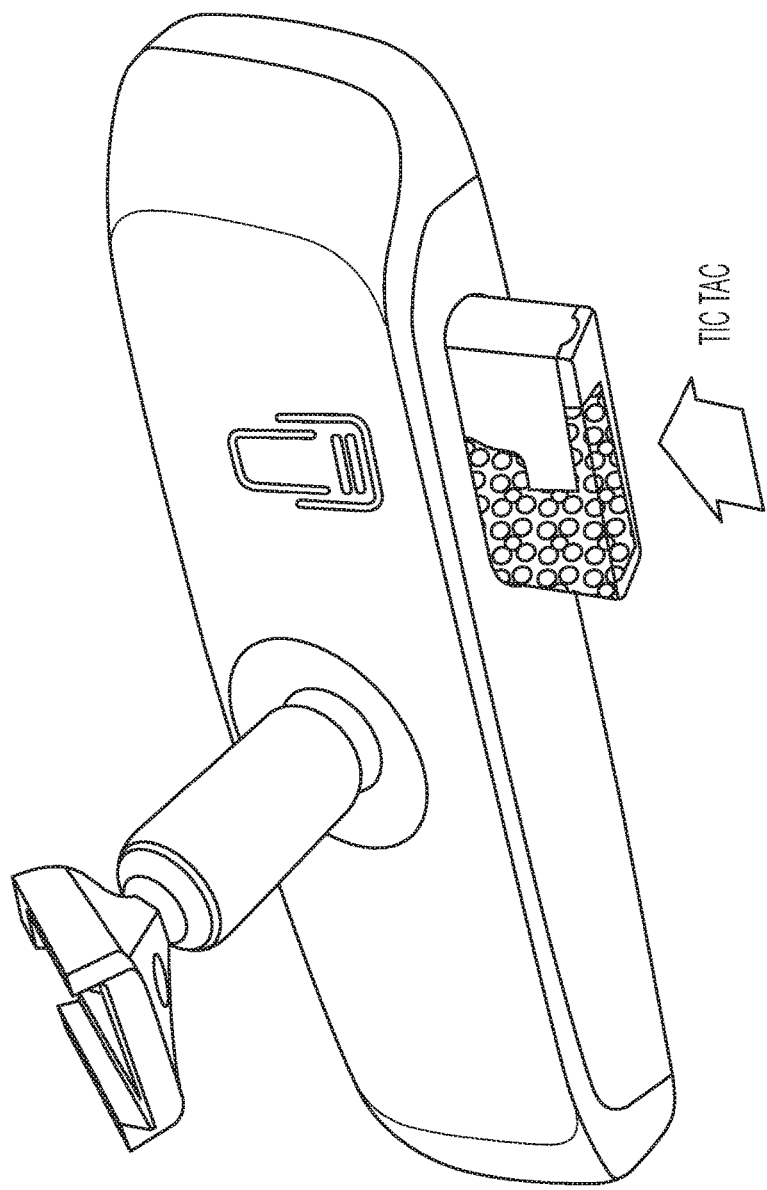
FIG. 43 is a perspective view of an interior rearview mirror assembly with a portable candy or breath freshener holder or dispenser module in accordance with the present invention.

Optionally, the suite of portable modules may include non-powered modules that provide various accessories at the mirror assembly for use by the driver or passenger of the vehicle (with each module being readily removable from the mirror assembly for use outside of the vehicle as well). For example, and as shown in FIG. 42, the module may comprise a wet wipe dispenser or facial tissue dispenser or the like, so that a user may readily pull a wipe or tissue from the module and mirror assembly when needed. Optionally, the module may comprise a hand sanitizer dispenser, whereby a user may press a button on the module and the module may dispense hand sanitizer solution or other liquid or solution into the user's hand. Optionally, for example, and as shown in FIG. 43, the module may comprise a breath mint or candy or gum holder/dispenser, whereby, when the module is received in the mirror assembly, a user can dispense the candy or gum or the like (or medicine or pills or the like) from the dispenser, preferably without removing the module from the mirror assembly.

Figure 44:
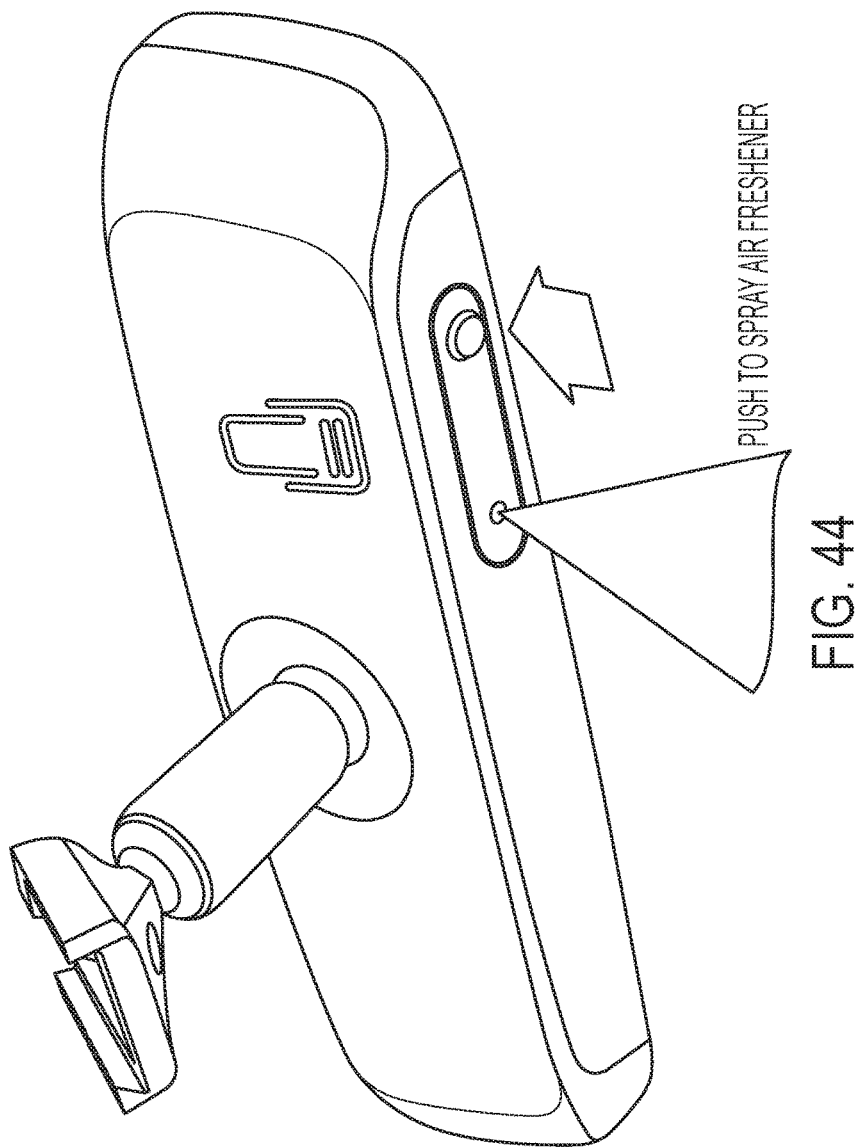
FIG. 44 is a perspective view of an interior rearview mirror assembly with a portable air freshener module in accordance with the present invention.
Figure 45:
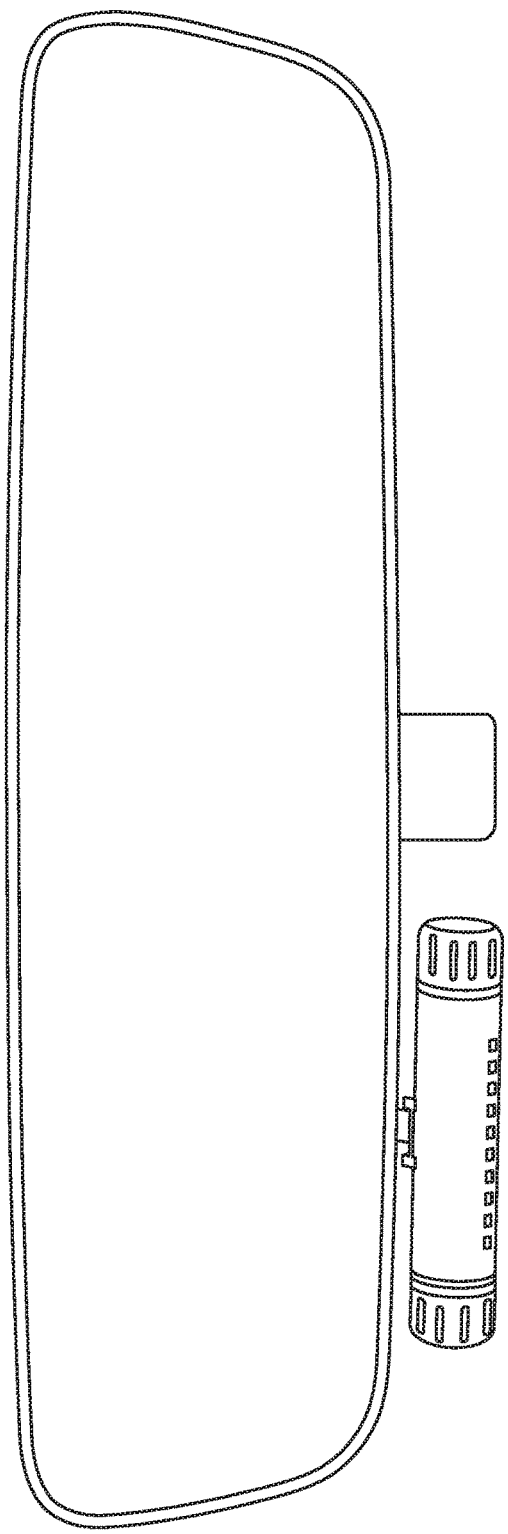
FIG. 45 is a perspective view of an interior rearview mirror assembly with another portable air freshener module in accordance with the present invention.
Figure 46:
FIG. 46 is a perspective view of an interior rearview mirror assembly with a portable clip module in accordance with the present invention.
Figure 47:
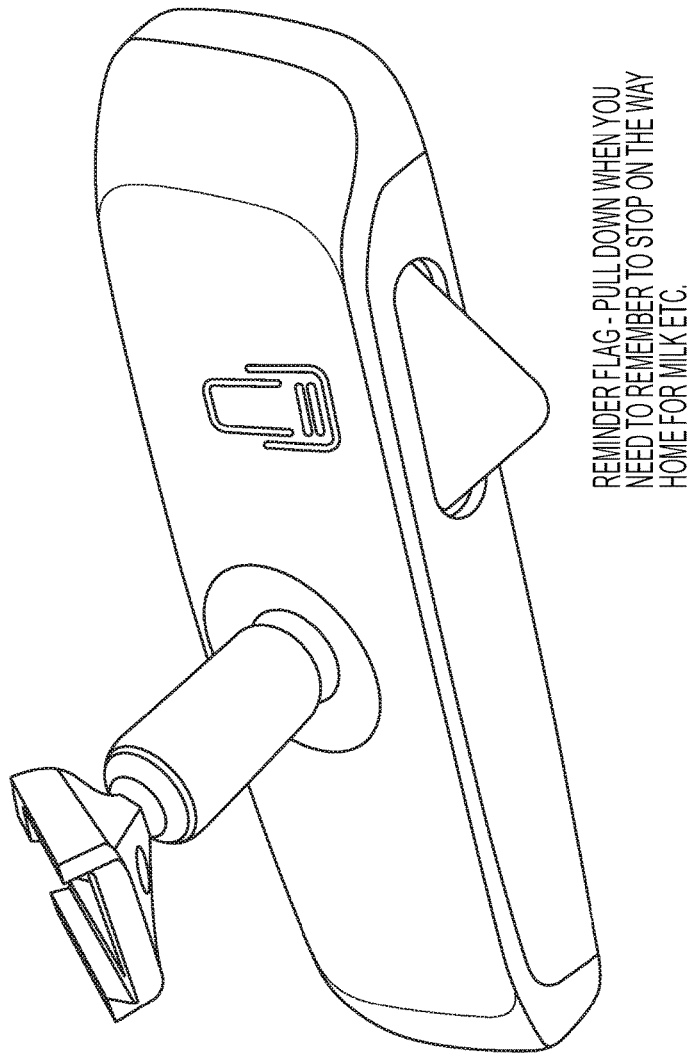
FIG. 47 is a perspective view of an interior rearview mirror assembly with a portable reminder flag module in accordance with the present invention.

Another of the suite of portable modules can be a portable air freshener/perfumer module that, when used in the mirror assembly mounted to the windshield in the subject equipped vehicle, can (such as shown in FIG. 44) eject a fragrance spray when user-pressed (or continuously without user intervention as shown in FIG. 45) so as to fragrance/perfume the interior cabin of the vehicle and/or an occupant thereof (or other spray devices or misters may be used with other liquids or chemicals, such as pepper spray or the like). Another of the suite of portable modules can be a clip or holder (FIG. 46), such as for clipping a photograph or reminder note or parking ticket or card (such as provided at a parking garage or lot) or the like at the mirror assembly so that it is readily viewable and/or accessible by the driver or passenger of the vehicle. Optionally, the module may comprise a reminder flag (FIG. 47), which the user may pull down to remind the user to do something, such as to remind the driver of the vehicle to stop at the grocery store on the way home or the like. When no reminder is needed, the flag may be pushed up into the module and stowed therein.

Figure 48:
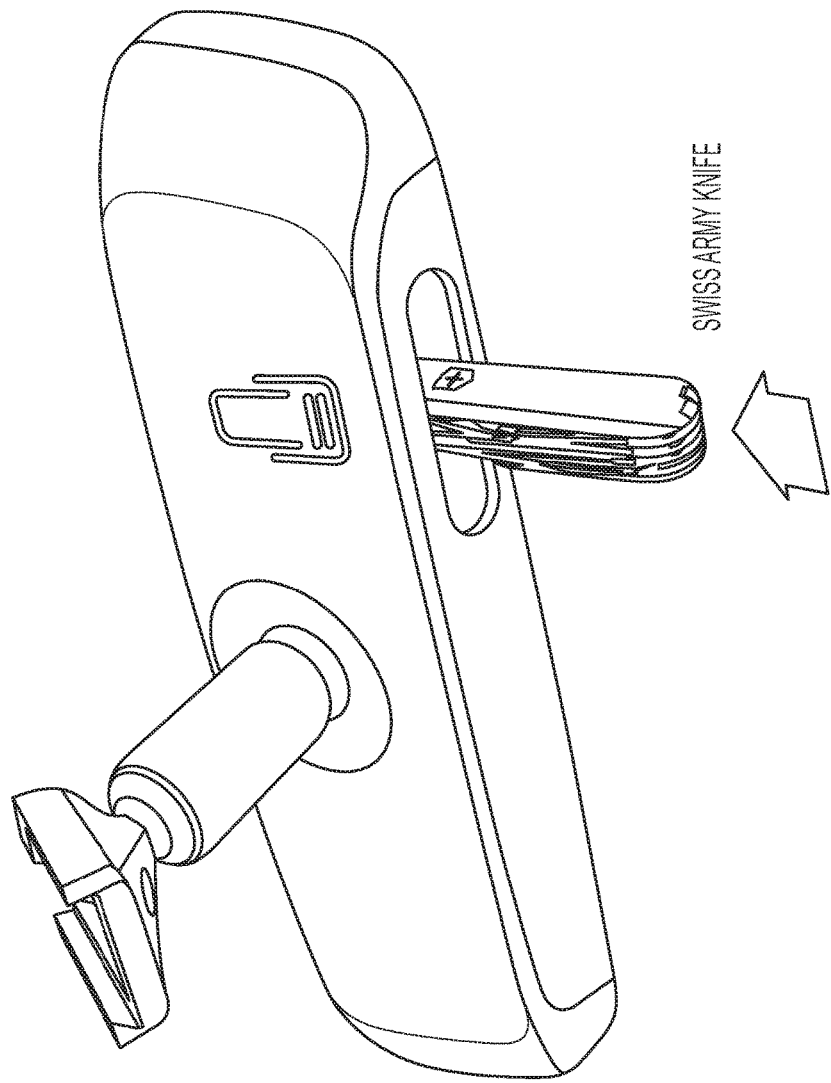
FIG. 48 is a perspective view of an interior rearview mirror assembly with a portable pocket knife or multi-tool module in accordance with the present invention.
Figure 49:
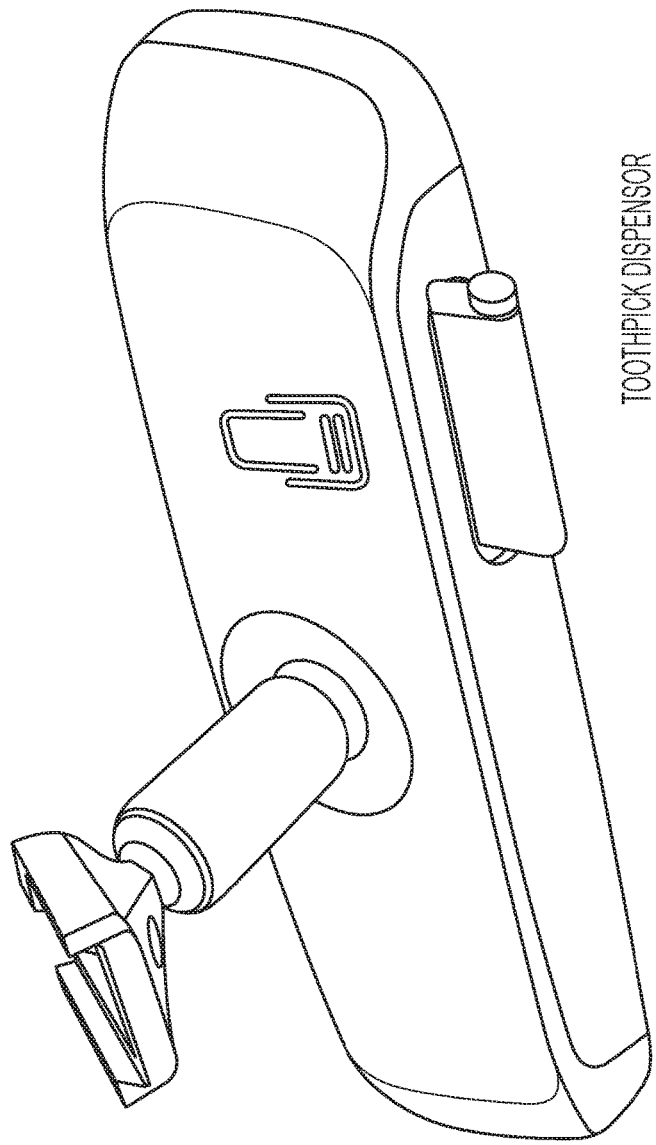
FIG. 49 is a perspective view of an interior rearview mirror assembly with a portable toothpick dispenser module in accordance with the present invention.

Optionally, the suite of portable modules may include various tools or the like that may be useful to the driver or passenger of the vehicle. For example, a knife or blade or tool (such as a Swiss Army knife or Leatherman tool or other multi-purpose or multi-function tool or the like) module (FIG. 48) may be provided for use with the mirror assembly. Optionally, the module may comprise a toothpick dispenser (FIG. 49) or the like. Other types of tools or items may be held and dispensed by a module of the present invention, such as lighters, makeup items, hair clips, bobby pins and/or the like, or such as a bottle opener or pen or stylus or change holder or the like.

The inclusion of a portable garage door opening module of the present invention (alone or as a member of a suite of portable modules) can utilize and benefit from constructions disclosed in U.S. Pat. Nos. 7,293,888; 7,012,727; 6,902,284 and 6,428,172 (which are hereby incorporated herein by reference in their entireties).

The self-contained, battery-operated, portable garage door opening module suitable to use in the present invention is compact and preferably has a length dimension in the about 2 cm to about 4 cm or so range, a width dimension in the about 2 cm to about 4 cm or so range, and a depth dimension in the about 1 cm to about 2.5 cm or so range.

A blank or push-out or plastic plug element may be provided and present when a portable module of the present invention is not being accommodated within the mirror casing (the mirror head) of the interior mirror assembly in order to fill/cover the slot established in the wall (typically, the underside wall) of the plastic mirror casing that allows the portable module to be inserted into and removed from the mirror head. This blank or push-out or plastic plug element is removable/removed when a portable module is inserted and is replaceable/replaced when the module is removed from the mirror casing.

The manufacturer of the interior rearview mirror assembly can ship interior mirror assemblies with such slots/blank or push-out or plastic plug element present but with no modules included, and leave it to either the vehicle dealership and/or the buyer of a vehicle equipped with such an interior mirror assembly to remove a blank or push-out or plastic plug element.

When the owner of a vehicle equipped with the present invention leaves the equipped vehicle for service at an automobile dealership or service shop or garage or the like, the personnel at that dealership may, as a courtesy or as a promotion, insert the likes of any of the portable modules described herein into an interior rearview mirror assembly of a vehicle that is left for service with its slot/receiving portion unoccupied by a portable module.

Thus, the present invention provides an interior rearview mirror assembly for a vehicle that comprises a mirror head having a mirror casing and a mirror reflective element, and a mirror mounting structure configured to adjustably mount the mirror head at an interior portion of a vehicle equipped with the interior rearview mirror assembly. The mirror assembly includes a receiving portion (that may be established at or through a wall of the mirror casing or may be established at the mirror mounting structure) for receiving a portable self-contained garage door opening module at least partially thereat. The portable self-contained garage door opening module comprises at least one user input and a housing that houses (i) garage door opener circuitry operable under rolling code, (ii) a radio frequency transmitter and (iii) a battery for electrically powering the circuitry. The portable self-contained garage door opening module is operable to wirelessly transmit a radio frequency signal responsive to actuation of the at least one user input of the portable self-contained garage door opening module. With the portable self-contained garage door opening module at least partially received at the receiving portion of the interior rearview mirror assembly, the at least one user input is accessible by a driver of the equipped vehicle. The portable self-contained garage door opening module is configured to cooperate with the receiving portion to releasably secure the portable self-contained garage door opening module at the interior rearview mirror assembly (such as at least partially at the receiving portion), and wherein the portable self-contained garage door opening module is releasable from the interior rearview mirror assembly (such as by cooperating with the receiving portion to release the module from the receiving portion).

Optionally, the receiving portion may be disposed at a lower region of the mirror casing when the interior rearview mirror assembly is mounted at the equipped vehicle. For example, the receiving portion may comprise an opening established through a wall (such as a lower wall) of the mirror casing. Optionally, the opening may comprise a slot established through the wall of the mirror casing. Optionally, at least one flap may be provided that covers the opening when the portable self-contained garage door opening module is not received at the receiving portion of the mirror casing. Optionally, the receiving portion may be disposed at the mirror mounting structure.

Optionally, the portable self-contained garage door opening module includes a visual indicator that is activated responsive to actuation of the at least one user input. The visual indicator may be disposed at a portion of the portable self-contained garage door opening module that is exposed when the portable self-contained garage door opening module is at least partially received at the receiving portion. The receiving portion may be disposed at the mirror casing with the visual indicator disposed behind the mirror reflective element when the portable self-contained garage door opening module is at least partially received at the receiving portion of the mirror casing, and the visual indicator, when activated, is viewable through the mirror reflective element by the driver of the equipped vehicle. Optionally, the at least one user input may comprise a glowing phosphorescent material.

Optionally, the portable self-contained garage door opening module cooperates with the receiving portion via a push-to-release mechanism, and the portable self-contained garage door opening module is pushed into the receiving portion to engage the push-to-release mechanism for releasably securing the portable self-contained garage door opening module at least partially at the receiving portion. The portable self-contained garage door opening module, when releasably secured at the receiving portion, is pushed to release the portable self-contained garage door opening module from the push-to-release mechanism of the receiving portion.

Optionally, the portable self-contained garage door opening module may be configured to cooperate with the receiving portion via a fastener that secures the portable self-contained garage door opening module at the receiving portion.

Optionally, a cover element is configured to attach at the receiving portion (such as at the mirror casing at or near an opening of the receiving portion that at least partially receives the portable self-contained garage door opening module threat) to releasably secure the portable self-contained garage door opening module at the receiving portion. The cover element is configured to receive light from a light source within the mirror assembly and, when the light source is activated, the cover element is illuminated. The light source may be activated responsive to a system of the vehicle and the cover element is illuminated to alert a person viewing the cover element. Optionally, the light source may be activated responsive to an ambient light sensor, whereby the cover element is illuminated when the light source is activated to enhance viewability of the portable self-contained garage door opening module at least partially secured at the receiving portion in low lighting conditions. The light source may comprise a light emitting diode disposed at a circuit board of the mirror head, and a light pipe may direct light emitted by the light emitting diode towards the cover element.

Optionally, the portable self-contained garage door opening module may comprise a member of a suite of portable modules, each configured for releasable cooperation with the receiving portion to releasably secure the portable module of the suite of portable modules at least partially at the receiving portion. For example, another member of the suite of portable modules may comprise a battery-operated light, which may include at least one white light emitting light emitting diode. Another member of the suite of portable modules may comprise an air freshener or a perfumer or the like.

The mirror reflective element may comprise any suitable reflective element, such as an electro-optic (such as electrochromic) reflective element or a prismatic reflective element. The mirror casing may include a bezel portion that circumscribes a perimeter region of the front surface of the reflective element or the reflective element may comprise a frameless reflective element, such as a frameless reflective element utilizing aspects of the reflective elements described in U.S. Pat. No. 8,508,831 and/or International Publication Nos. WO 2010/124064, WO 2011/044312, WO 2012/051500 and/or WO 2013/071070, which are hereby incorporated herein by reference in their entireties. For example, and such as can be seen with reference to FIG. 7, the mirror reflective element may comprise a glass substrate having a perimeter edge, with the perimeter edge of the glass substrate being exposed to and viewable by the driver of the vehicle when the interior rearview mirror assembly is normally mounted in the vehicle, and with the perimeter edge of said glass substrate comprising a curved surface disposed between a front surface of the glass substrate and the mirror casing.

Optionally, for example, the reflective element may comprise a laminate construction variable reflectance electro-optic (such as electrochromic) reflective element assembly having a front substrate and a rear substrate with an electro-optic medium (such as electrochromic medium) sandwiched therebetween and bounded by a perimeter seal. The front substrate has a front or first surface (the surface that generally faces the driver of a vehicle when the mirror assembly is normally mounted at the vehicle) and a rear or second surface opposite the front surface, and the rear substrate has a front or third surface and a rear or fourth surface opposite the front surface, with the electro-optic medium disposed between the second surface and the third surface and bounded by the perimeter seal of the reflective element (such as is known in the electrochromic mirror art). The second surface has a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface has a metallic reflector coating (or multiple layers or coatings) established thereat. The front or third surface of rear substrate may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108 (which are hereby incorporated herein by reference in their entireties), or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064; WO 2011/044312; WO 2012/051500 and/or WO 2013/071070, which are hereby incorporated herein by reference in their entireties (and with electrochromic and prismatic mirrors of such construction are commercially available from the assignee of this application under the trade name INFINITY™ mirror).

Optionally, it is envisioned that the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or U.S. Publication No. US-2006-0050018, which are all hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855;755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Publication Nos. US-2006-0061008; US-2006-0050018; US-2009-0015736; US-2009-0015736 and/or US-2010-0097469, and/or PCT Application No. PCT/US10/47256, filed Aug. 31, 2010, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are all hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EyeQ™ image processing chip available from Mobileye Vision Technologies Ltd. of Jerusalem, Israel, and such as an image processor of the types described in International Pub. No. WO/2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820, 245; 5,673,994; 5,649,756; 5,178,448; 5,671,996; 4,646, 210; 4,733,336; 4,807,096; 6,042,253; 5,669,698; 7,195, 381; 6,971,775 and/or 7,249,860, microphones, such as disclosed in U.S. Pat. Nos. 7,657,052; 6,243,003; 6,278,377 and/or 6,420,975, speakers, a voice recorder, an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like), a seat occupancy detector, a remote starter control, a yaw sensor, a clock, a carbon monoxide detector, status displays, such as displays that display a status of a door of the vehicle, a transmission selection (4 wd/2 wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/ or 7,423,522, and/or an ONSTAR® system, a compass, such as disclosed in U.S. Pat. Nos. 5,924,212; 4,862,594; 4,937, 945; 5,131,154; 5,255,442 and/or 5,632,092, and/or any other accessory or circuitry or the like (with all of the above-referenced patents and publications being commonly assigned and being hereby incorporated herein by reference in their entireties).

The mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. Optionally, the mirror assembly may comprise a modular mirror construction, and may include back housing portions or the like, such as cap portions of the types described in U.S. Pat. No. 7,289,037, which is hereby incorporated herein by reference in its entirety. Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451 and/or 7,289,037, which are hereby incorporated herein by reference in their entireties.

Optionally, the accessory or accessories, such as those described above, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:

a mirror head comprising a mirror casing and a mirror reflective element;

a mirror mounting structure configured to adjustably mount said mirror head at an interior portion of a vehicle equipped with said interior rearview mirror assembly;

a receiving portion of said mirror head for receiving a portable self-contained garage door opening module;

wherein said receiving portion is disposed at a lower region of said mirror casing when said interior rearview mirror assembly is mounted at the equipped vehicle, and wherein said receiving portion comprises an opening established through a wall of said mirror casing;

wherein said portable self-contained garage door opening module comprises a user input and a housing that houses (i) garage door opener circuitry operable under rolling code, (ii) a radio frequency transmitter and (iii) a battery for electrically powering said circuitry, and wherein said portable self-contained garage door opening module is operable to wirelessly transmit a radio frequency signal responsive to actuation of said user input of said portable self-contained garage door opening module;

wherein, with said portable self-contained garage door opening module received at said receiving portion of said interior rearview mirror assembly, said user input is accessible by a driver of the equipped vehicle;

wherein said portable self-contained garage door opening module is configured to cooperate with said receiving portion to releasably secure said portable self-contained garage door opening module at said interior rearview mirror assembly, and wherein said portable self-contained garage door opening module is releasable and removable from said interior rearview mirror assembly;

wherein, with said portable self-contained garage door opening module received at said mirror head, said portable self-contained garage door opening module, responsive to actuation of said user input, wirelessly transmits a radio frequency signal to open a garage door; and wherein, with said portable self-contained garage door opening module removed from said mirror head, said portable self-contained garage door opening module, responsive to actuation of said user input, wirelessly transmits the radio frequency signal to open the garage door.

2. The interior rearview mirror assembly of claim 1, wherein said portable self-contained garage door opening module includes a visual indicator that is activated responsive to actuation of said user input.

3. The interior rearview mirror assembly of claim 2, wherein said visual indicator is disposed at a portion of said portable self-contained garage door opening module that is exposed when said portable self-contained garage door opening module is received at said receiving portion.

4. The interior rearview mirror assembly of claim 2, wherein said receiving portion is disposed at said mirror casing and wherein said visual indicator is disposed behind said mirror reflective element when said portable self-contained garage door opening module is received at said receiving portion of said mirror casing, and wherein said visual indicator, when activated, is viewable through said mirror reflective element by the driver of the equipped vehicle.

5. The interior rearview mirror assembly of claim 1, wherein said portable self-contained garage door opening module cooperates with said receiving portion via a push-to-release mechanism, and wherein said portable self-contained garage door opening module is pushed into said receiving portion to engage said push-to-release mechanism for releasably securing said portable self-contained garage door opening module at said receiving portion, and wherein said portable self-contained garage door opening module, when releasably secured at said receiving portion, is pushed to release said portable self-contained garage door opening module from said push-to-release mechanism of said receiving portion.

6. The interior rearview mirror assembly of claim 1, wherein said portable self-contained garage door opening module is configured to cooperate with said receiving portion via a fastener that secures said portable self-contained garage door opening module at said receiving portion.

7. The interior rearview mirror assembly of claim 1, wherein a cover element is configured to attach at said receiving portion to releasably secure said portable self-contained garage door opening module at said receiving portion.

8. The interior rearview mirror assembly of claim 7, wherein said cover element is configured to receive light from a light source within said mirror assembly and wherein, when said light source is activated, said cover element is illuminated.

9. The interior rearview mirror assembly of claim 8, wherein said light source is activated responsive to a system of the vehicle and said cover element is illuminated to alert a person viewing said cover element.

10. The interior rearview mirror assembly of claim 8, wherein said light source is activated responsive to an ambient light sensor, and wherein said cover element is illuminated when said light source is activated to enhance viewability of said portable self-contained garage door opening module releasably secured at said receiving portion in low lighting conditions.

11. The interior rearview mirror assembly of claim 8, wherein said light source comprises a light emitting diode disposed at a circuit board of said mirror head, and wherein a light pipe directs light emitted by said light emitting diode towards said cover element.

12. An interior rearview mirror assembly for a vehicle, said interior rearview mirror assembly comprising:

a mirror head comprising a mirror casing and a mirror reflective element;

a mirror mounting structure configured to adjustably mount said mirror head at an interior portion of a vehicle equipped with said interior rearview mirror assembly;

a receiving portion of said mirror head for receiving a portable self-contained garage door opening module;

wherein said receiving portion is disposed at a lower region of said mirror casing when said interior rearview mirror assembly is mounted at the equipped vehicle, and wherein said receiving portion comprises an opening established through a wall of said mirror casing;

wherein said portable self-contained garage door opening module comprises a user input and a housing that houses (i) garage door opener circuitry operable under rolling code, (ii) a radio frequency transmitter and (iii) a battery for electrically powering said circuitry, and wherein said portable self-contained garage door opening module is operable to wirelessly transmit a radio frequency signal responsive to actuation of said user input of said portable self-contained garage door opening module;

wherein, with said portable self-contained garage door opening module received at said receiving portion of said interior rearview mirror assembly, said user input is accessible by a driver of the equipped vehicle;

wherein said portable self-contained garage door opening module is configured to cooperate with said receiving portion to releasably secure said portable self-contained garage door opening module at said interior rearview mirror assembly, and wherein said portable self-contained garage door opening module is releasable and removable from said interior rearview mirror assembly;

wherein said portable self-contained garage door opening module includes a visual indicator that is activated responsive to actuation of said user input, and wherein said visual indicator comprises at least one light emitting diode that is viewable by the driver of the vehicle when said portable self-contained garage door opening module is received at said receiving portion of said interior rearview mirror assembly;

wherein, with said portable self-contained garage door opening module received at said mirror head, said portable self-contained garage door opening module, responsive to actuation of said user input, wirelessly transmits a radio frequency signal to open a garage door; and wherein, with said portable self-contained garage door opening module removed from said mirror head, said portable self-contained garage door opening module, responsive to actuation of said user input, wirelessly transmits the radio frequency signal to open the garage door.

13. The interior rearview mirror assembly of claim 12, wherein said visual indicator is disposed at a portion of said portable self-contained garage door opening module that is exposed when said portable self-contained garage door opening module is received at said receiving portion.

14. The interior rearview mirror assembly of claim 12, wherein said receiving portion is disposed at said mirror casing and wherein said visual indicator is disposed behind said mirror reflective element when said portable self-contained garage door opening module is received at said receiving portion of said mirror casing, and wherein said visual indicator, when activated, is viewable through said mirror reflective element by the driver of the equipped vehicle.

15. The interior rearview mirror assembly of claim 12, wherein a cover element is configured to attach at said receiving portion to releasably secure said portable self-contained garage door opening module at said receiving portion, and wherein said cover element is configured to receive light from a light source within said mirror assembly and wherein, when said light source is activated, said cover element is illuminated.

16. The interior rearview mirror assembly of claim 15, wherein said light source is activated responsive to a system of the vehicle and said cover element is illuminated to alert a person viewing said cover element.

17. The interior rearview mirror assembly of claim 15, wherein said light source is activated responsive to an ambient light sensor, and wherein said cover element is illuminated when said light source is activated to enhance viewability of said portable self-contained garage door opening module releasably secured at said receiving portion in low lighting conditions.

18. An interior rearview mirror assembly for a vehicle, said interior rearview mirror assembly comprising:
   a mirror head comprising a mirror casing and a mirror reflective element;
   a mirror mounting structure configured to adjustably mount said mirror head at an interior portion of a vehicle equipped with said interior rearview mirror assembly;
   a receiving portion of said mirror head for receiving a portable self-contained garage door opening module;
   wherein said receiving portion is disposed at a lower region of said mirror casing when said interior rearview mirror assembly is mounted at the equipped vehicle, and wherein said receiving portion comprises an opening established through a wall of said mirror casing;
   wherein said portable self-contained garage door opening module comprises a user input and a housing that houses (i) garage door opener circuitry operable under rolling code, (ii) a radio frequency transmitter and (iii) a battery for electrically powering said circuitry, and wherein said portable self-contained garage door opening module is operable to wirelessly transmit a radio frequency signal responsive to actuation of said user input of said portable self-contained garage door opening module;
   wherein, with said portable self-contained garage door opening module received at said receiving portion of said interior rearview mirror assembly, said user input is accessible by a driver of the equipped vehicle;
   wherein said portable self-contained garage door opening module is configured to cooperate with said receiving portion to releasably secure said portable self-contained garage door opening module at said interior rearview mirror assembly, and wherein said portable self-contained garage door opening module is releasable and removable from said interior rearview mirror assembly;
   wherein said portable self-contained garage door opening module cooperates with said receiving portion via a mechanical release, and wherein said portable self-contained garage door opening module is pushed into said receiving portion to engage said mechanical release for releasably securing said portable self-contained garage door opening module at said receiving portion, and wherein said portable self-contained garage door opening module, when releasably secured at said receiving portion, is releasable from said mechanical release of said receiving portion;
   wherein, with said portable self-contained garage door opening module received at said mirror head, said portable self-contained garage door opening module, responsive to actuation of said user input, wirelessly transmits a radio frequency signal to open a garage door; and
   wherein, with said portable self-contained garage door opening module removed from said mirror head, said portable self-contained garage door opening module, responsive to actuation of said user input, wirelessly transmits the radio frequency signal to open the garage door.

19. The interior rearview mirror assembly of claim 18, wherein said portable self-contained garage door opening module includes a visual indicator that is activated responsive to actuation of said user input, and wherein said visual indicator comprises at least one light emitting diode that is viewable by the driver of the vehicle when said portable self-contained garage door opening module is received at said receiving portion of said interior rearview mirror assembly.

20. The interior rearview mirror assembly of claim 18, wherein a cover element is configured to attach at said receiving portion to releasably secure said portable self-contained garage door opening module at said receiving portion.

* * * * *